US006694400B1

(12) United States Patent
Lai et al.

(10) Patent No.: US 6,694,400 B1
(45) Date of Patent: Feb. 17, 2004

(54) PCI SYSTEM CONTROLLER CAPABLE OF DELAYED TRANSACTION

(75) Inventors: Jiin Lai, Taipei (TW); Chau-Chad Tsai, Taipei (TW); Chen-Ping Yang, Taipei (TW); Sheng-Chang Peng, Taipei (TW); Tse-Hsien Wang, Pa-Te (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/451,121

(22) Filed: Nov. 30, 1999

(30) Foreign Application Priority Data

Apr. 23, 1999 (TW) ........................................ 88106504 A

(51) Int. Cl.[7] ................................................ G06F 13/38
(52) U.S. Cl. ........................................ 710/305; 710/107
(58) Field of Search ................................ 710/100, 305, 710/306, 241, 112, 113, 240, 309, 310, 107, 52

(56) References Cited

U.S. PATENT DOCUMENTS

| | | | | |
|---|---|---|---|---|
| 5,615,343 A | * | 3/1997 | Sarangdhar et al. | 710/112 |
| 5,764,929 A | * | 6/1998 | Kelley et al. | 710/100 |
| 5,850,530 A | * | 12/1998 | Chen et al. | 710/100 |
| 5,870,567 A | * | 2/1999 | Hausauer et al. | 710/112 |
| 6,012,118 A | * | 1/2000 | Jayakumar et al. | 710/107 |
| 6,070,209 A | * | 5/2000 | Hausauer | 710/104 |
| 6,195,722 B1 | * | 2/2001 | Ram et al. | 710/310 |
| 6,247,086 B1 | * | 6/2001 | Allingham | 710/314 |
| 6,286,074 B1 | * | 9/2001 | Batchelor et al. | 710/305 |
| 6,397,279 B1 | * | 5/2002 | Jaramillo et al. | 710/105 |

* cited by examiner

*Primary Examiner*—Xuan M. Thai
(74) *Attorney, Agent, or Firm*—J.C. Patents

(57) ABSTRACT

A method of conducting delayed data transaction on a PCI system and its associated devices. The delayed data transaction is carried out using a PCI system to transmit data between an initiator and a responder. Both the initiator and the responder are coupled to a PCI bus. The delayed transaction in the PCI system includes a number of steps. To begin with, the initiator will send out a request to use the PCI bus so that data transmission can be conducted with respect to the responder. If the responder accepts the request but unable to secure the requested data soon enough, the responder will generate a defer identifier that corresponds to the requesting initiator. Next, a stop signal and the defer identifier generated by the responder will be returned to the initiator, indicating that the request has been accepted. When the requested data is ready in the responder, the responder will forward the defer identifier again. The initiator picks up the defer identifier and prepares according to the buffer identifier in it. Then, data transmission between the initiator and the responder begins.

56 Claims, 12 Drawing Sheets

300
200
204
250
104
100
CENTRAL RESOURCE UNIT
ADDRESS QUEUE
ADDRESS QUEUE
FUNCTIONAL UNIT
102a
208
108
TARGET QUEUE MANAGER
BUS INTERFACE UNIT
BUS INTERFACE UNIT
INITIATOR QUEUE MANAGER
FUNCTIONAL UNIT
102b
206
106
DATA QUEUE
DATA DISTRIBUTOR
110
DEFER ADDRESS COMPARATOR
FUNCTIONAL UNIT
102n
112
212
DEFER ADDRESS GENERATOR
DEFER ADDRESS REGISTER
210
114

| 31 20 | 19 12 | 11 10 | 9 4 | 3 0 |
|---|---|---|---|---|
| DRFER ADDRESS DfrA | EXPECTED TIME DELAY | 0 0 | RESERVEO | BUFFER IDENTIFIER |

PCI SYSTEM CONTROLLER CAPABLE OF DELAYED TRANSACTION

CROSS-REFERENCE TO RELATED APPLICATION

This application claims the priority benefit of Taiwan application serial no. 88106504, filed Apr. 23, 1999. The present application is related to copending filed on the same date as this application, entitled "DELAYED TRANSACTION METHOD AND DEVICE USED IN A PCI SYSTEM" by LAI et al., currently pending.

BACKGROUND OF THE INVENTION

1. Field of Invention

The present invention relates to a method for controlling peripheral components. More particularly, the present invention relates to the transfer of data via a peripheral component interconnect (PCI) bus.

2. Description of Related Art

FIG. 1 shows a conventional computer architecture that uses a PCI bus. As shown in FIG. 1, a PCI host bridge 12 is coupled to a PCI bus 14. The PCI bus 14 is capable of coupling to a number of PCI compatible master controllers, which are embedded within a peripheral component. The peripheral components may include, for example, a graphic adapter 16*a*, an expansion bus bridge 16*b*, a LAN adapter 16*c* and SCSI host bus adapter 16*d*. Each master controller within these peripheral components is capable of sending out a request (REQ) signal to the arbiter within the PCI bridge 12 via the PCI bus 14 requesting for data transfer through the PCI bus. On receiving the request (REQ), the PCI bridge 12 can issue a grant (GNT) signal to the master controller accepting its use of the PCI bus 14.

Data transfer between different PCI compatible components (for example, a master controller and the north bridge of a computer chipset) can be realized through an interface control signal described below. In the beginning, a cycle frame (FRAME) is transmitted from an initiator (possibly a master controller or a north bridge) signaling the initiation of a data accessing period. The sending of a FRAME signal implies that a data transaction through the PCI bus has begun. As long as the FRAME signal remains at a low potential, it means the data transaction is still under way. Soon after the FRAME signal is out, valid address will be set up on address bus lines AD during the address phase. At the same time, valid bus commands (meeting PCI specifications) will be sent from the command/byte enable (CBE [3:0]) lines so that the target device will notice the kind of data transaction demanded by the initiator. In general, the command/byte enable uses four bits on four lines to encode 16 commands, and relevant details can be found in the PCI specifications. After valid address is out, the requested data will be put on the address/data bus AD in the so-called data phase. In the meantime, byte enable signals corresponding to the encoded bus command will be sent through the CBE lines for data transmission. When the FRAME signal is finally terminated by the initiator, this implies either the last set of data is out, or data transmission is complete. During the data transmission phase, the initiator ready (IRDY) signal and the target ready (TRDY) signal work with each other for indicating the state of affairs in the initiator and the target device. The two synchronize with each other so that data transmission can be carried out smoothly. During a data read operation, putting up an IRDY signal implies the initiator is ready to receive data. During a data write operation, putting up a TRDY signal implies the target is ready to receive data. In addition, there is a stop (STOP) signal that can be set up by the target device requesting the initiator to cancel the current data transaction.

FIG. 2 is a timing diagram showing the sequence of events at a PCI bus interface during a read operation. A period within which the entire process of data transfer is carried out using a PCI bus is known as a bus transaction period 20. The bus transaction period 20 can be divided into an address phase 22 and several data phases such as 24*a*, 24*b* and 24*c*. Each data phase 24*a*/*b*/*c* can be further divided into a wait cycle 26*a*/*b*/*c* and a data transfer cycle 28*a*/*b*/*c*. Next, the operation of the PCI system is explained with respect to the various aforementioned controlling signals according to PCI specifications.

First, in cycle T1, the initiator will submit a FRAME signal indicating the start of a data transfer operation, and then a start address is submitted via the address/data bus AD for pin-pointing at a target device. At the same time, the CBE line will issue a read instruction. Thereafter, the CBE line will issue a byte enable signal. The byte enable signal is maintained throughout the entire data phase (including 24*a*, 24*b* and 24*c*). In cycle T2, the initiator will forward an initiator ready IRDY signal indicating data transfer can begin. If, at this moment, the target device is not ready yet, the initiator must wait until the target device is ready. The waiting period is known as a wait cycle 26*a*. Later, in cycle T3, the target device is ready and hence a target ready TRDY signal is issued by the target device. Therefore, during data transfer cycle 28*a*, data is read from the target device to the initiator. In cycle T4, the target ready TRDY signal is terminated signaling the end of data transfer. Next, the second set of data is being prepared while the wait cycle 26*b* of the second data transfer cycle 24*b* begins. In cycle T5, target ready TRDY signal is again issued implying that the second set of data is ready. When the initiator ready IRDY signal and the target ready TRDY signal are up during data transfer cycle 28*b*, the second set of data is transferred from the target device to the initiator. When the initiator could not read the incoming data fast enough, the initiator will terminate the initiator ready IRDY signal in cycle T6, for example. Since the target ready TRDY signal is still up, the wait cycle 26*c* is actually initiated by the initiator. As soon as the initiator is ready again, an initiator ready IRDY signal is submitted in cycle T7. Now, the initiator ready IRDY signal and the target ready TRDY signal are up again during data transfer cycle 28*c*, so the remaining third set of data are read from the target device to the initiator. Hence, the entire read operation is complete.

In the PCI specifications (for example, in version 2.2), a special type of data transfer mode commonly referred to as delayed transaction exists. The so-called delayed transaction is an operating sequence that is employed when the complete transfer of data could not be finished within the initial data phase. There are two main types of components that possibly require delayed transaction, namely, an input/output (I/O) controller and a bridging device. Usually, an I/O controller can process only one delay transaction at a time, whereas a bridging device can process a multiple of delayed transactions simultaneously thereby giving an improved system efficiency.

Conventional delayed transaction involves three cycles. First, the master controller will submit a request for using the PCI bus. Next, the target device will try to complete the operations requested by the master controller. Finally, the transaction is completed by the master controller. During the entire delayed transaction cycle, the master controller not only will continuously submit request signals, but will also seek out the current status of the target device through operations similar to polling. Thus, the PCI bus is fully occupied and hence unable to perform any other operations.

For a PCI system under the conventional delayed transaction mode, if a transaction needs to be re-tried, the master controller has to forward a request REQ signal to the PCI bus repeatedly. The master controller has to repeat the request REQ signal to the PCI bus until data are ready for transmission. Since the PCI bus is fully occupied when the master controller keeps putting up data requests, any other data transfer operations are impossible. Consequently, the PCI bus is very much underutilized.

In light of the foregoing, there is an urgent need to improve the degree of utilization of the PCI bus.

SUMMARY OF THE INVENTION

Accordingly, the present invention is to provide a method of conducting delayed data transaction on a PCI system capable of reducing the period within which the bus is occupied by a PCI compatible master controller so that system efficiency is improved.

A second aspect of the invention is to provide a method of conducting delayed data transaction on a PCI system whose target device is capable of acting like a master controller so that the target device can return the requested data to the requesting master controller automatically once the data is ready.

A third aspect of the invention is to provide a method of conducting delayed data transaction on a PCI system such that the target device is capable of generating a defer address and a defer identifier if the target device needs time to retrieve the requested data. Therefore, when the requested data is ready, the target device will be able to return the data to the requesting master controller correctly.

A fourth aspect of the invention is to provide a method of conducting delayed data transaction on a PCI system that can be implemented with appropriate hardware construction.

To achieve these and other advantages and in accordance with the purpose of the invention, as embodied and broadly described herein, the invention provides a method of conducting delayed data transaction on a PCI system and its associated devices. The delayed data transaction is carried out using a PCI system to transmit data between an initiator and a responder. Both the initiator and the responder are coupled to a PCI bus. The delayed transaction in the PCI system includes a number of steps. To begin with, the initiator will send out a request to use the PCI bus so that data transmission can be conducted with the responder. If the responder accepts the request but unable to secure the requested data soon enough, the responder will generate a defer identifier that corresponds to the requesting initiator. Next, a stop signal and the defer identifier generated by the responder will be returned to the initiator. When the requested data is ready in the responder, the responder will forward the defer identifier again. The initiator picks up the defer identifier and prepares itself according to the defer identifier, and then data transmission between the initiator and the responder begins. The defer identifier further includes a defer address and a buffer identifier. The defer address corresponds to the initiator. The buffer identifier corresponds to one of the data transactions being processed inside the responder, and one of the functional units inside the initiator.

In a second embodiment of this invention, a method of conducting delayed data transaction on a PCI system is provided. The delayed data transaction is carried out using a PCI system to transmit data between a first initiator and a responder, and a second initiator and the same responder. The first initiator, the second initiator and the responder are all coupled to the PCI bus. The delayed transaction in the PCI system includes a number of steps. To begin with, the first initiator will send out a request to use the PCI bus so that data transmission can be conducted with the responder. If the responder accepts the request but unable to secure the requested data soon enough, the responder will generate a first defer identifier that corresponds to the requesting first initiator. Next, a stop signal and the first defer identifier generated by the responder will be return to the first initiator. Later, the second initiator also needs to have some data. Hence, the second initiator will send out a request to use the PCI bus so that data transmission can be conducted with the responder. If the responder accepts the request but unable to secure the requested data soon enough, the responder will generate a second defer identifier that corresponds to the requesting second initiator. Next, a stop signal and the second defer identifier generated by the responder will be returned to the second initiator. When the data requested by the first initiator is ready in the responder, the responder will forward the first defer identifier as the address of the respond transaction. The first initiator picks up the first defer identifier and prepares according to the first defer identifier, and then data transmission between the first initiator and the responder begins. Similarly, when the data requested by the second initiator is ready in the responder, the responder will forward the second defer identifier as the address of the respond transaction. The second initiator picks up the second defer identifier and prepares according to the second defer identifier, and then data transmission between the second initiator and the responder begins. The first defer identifier further includes a defer address and a buffer identifier such that the defer address corresponds to the first initiator while the buffer identifier corresponds to one of the data transactions being processed inside the responder. In addition, if the responder is unable to process the data request generated by the second initiator, the responder will generate an invalid defer identifier that corresponds to the second initiator. The invalid defer identifier will be returned to the second initiator informing the initiator to put up its request again.

In a third embodiment of this invention, a method of conducting delayed data transaction on a PCI system is provided. The delayed data transaction is carried out using a PCI system to transmit data between an initiator and a responder. Both the initiator and the responder are coupled to a PCI bus. The delayed transaction in the PCI system includes a number of steps. To begin with, the initiator will send out a first request to use the PCI bus so that data transmission can be conducted with the responder. If the responder accepts the first request but unable to secure the data requested by the first request soon enough, the responder will generate a first defer identifier that corresponds to the requesting first initiator. Next, a stop signal and the first defer identifier generated by the responder will be returned to the initiator. Later, the initiator needs to have some other data. Hence, the initiator sends out a second request to use the PCI bus so that data transmission can be conducted with the responder. If the responder accepts the second request but unable to secure the data requested by the second request data soon enough, the responder will generate a second defer identifier that corresponds to the second request of the initiator. Next, a stop signal and the second defer identifier generated by the responder will be returned to the initiator. When the data requested by the first request of the initiator is ready in the responder, the responder will forward the first defer identifier as the address of the transaction responding to the first request. The initiator picks up the first defer identifier and prepares according to the first defer identifier, and then data transmission between the initiator and the responder begins. Similarly, when the data requested by the second request of the initiator is ready in the responder, the responder will forward the second defer identifier as the address of the transaction responding to the second request. The initiator picks up the second defer identifier and prepares according to the second defer identifier, and then data transmission between the initiator and the responder begins. The first defer identifier further includes a defer address and a first buffer identifier, and the second defer identifier further includes a defer address and a second buffer identifier. The defer address corresponds to the initiator. The first defer identifier corresponds to a first data transaction within the responder, and the second defer identifier corresponds to a second data transaction within the responder. In addition, if the responder is unable to process the second data request generated by the initiator, the responder will generate an invalid defer identifier that corresponds to the second request of the initiator. The invalid defer identifier will be returned to the initiator informing the initiator to put up its second request again.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
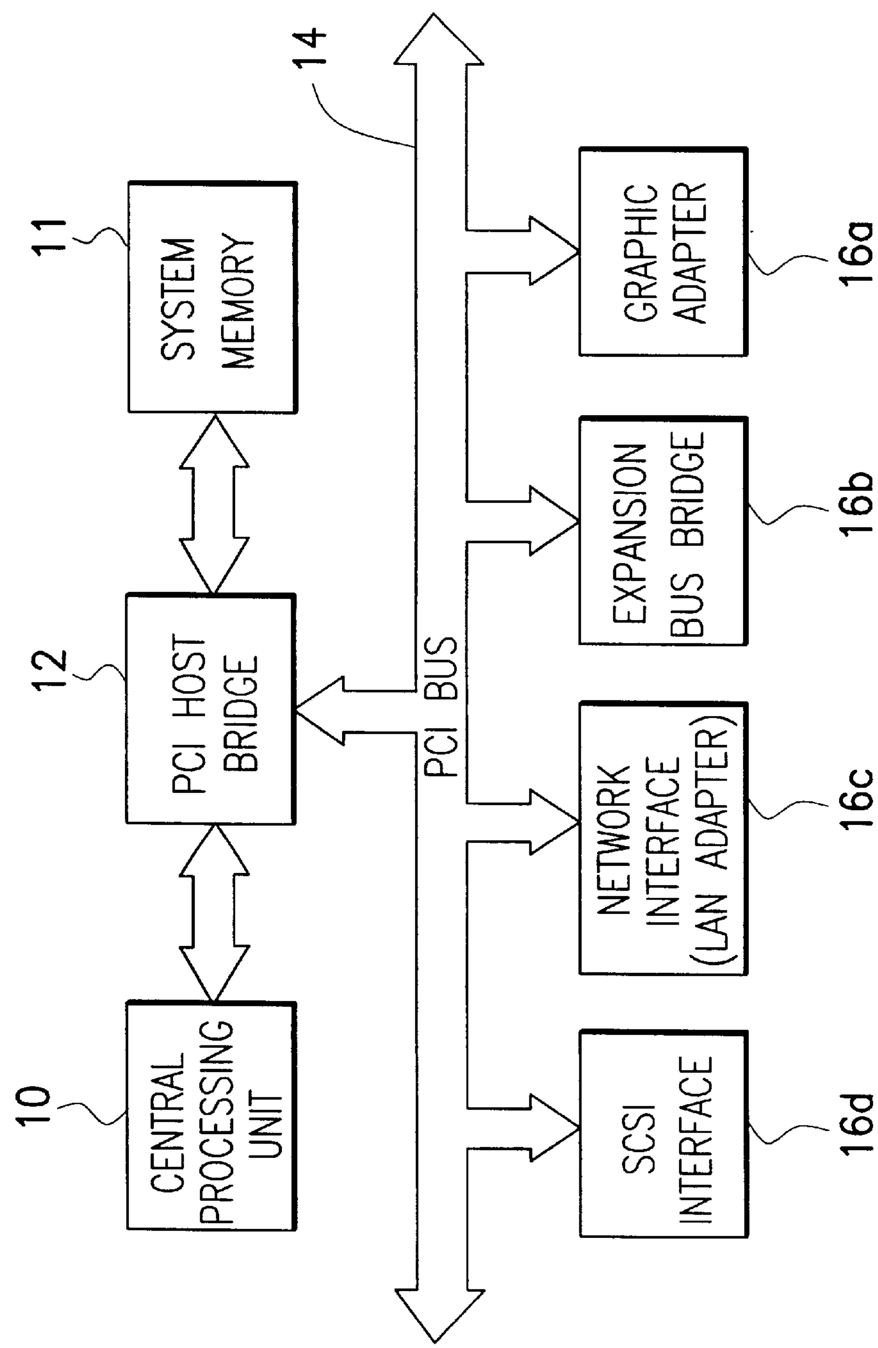
FIG. 1 shows a conventional computer architecture that uses a PCI bus.
Figure 2:
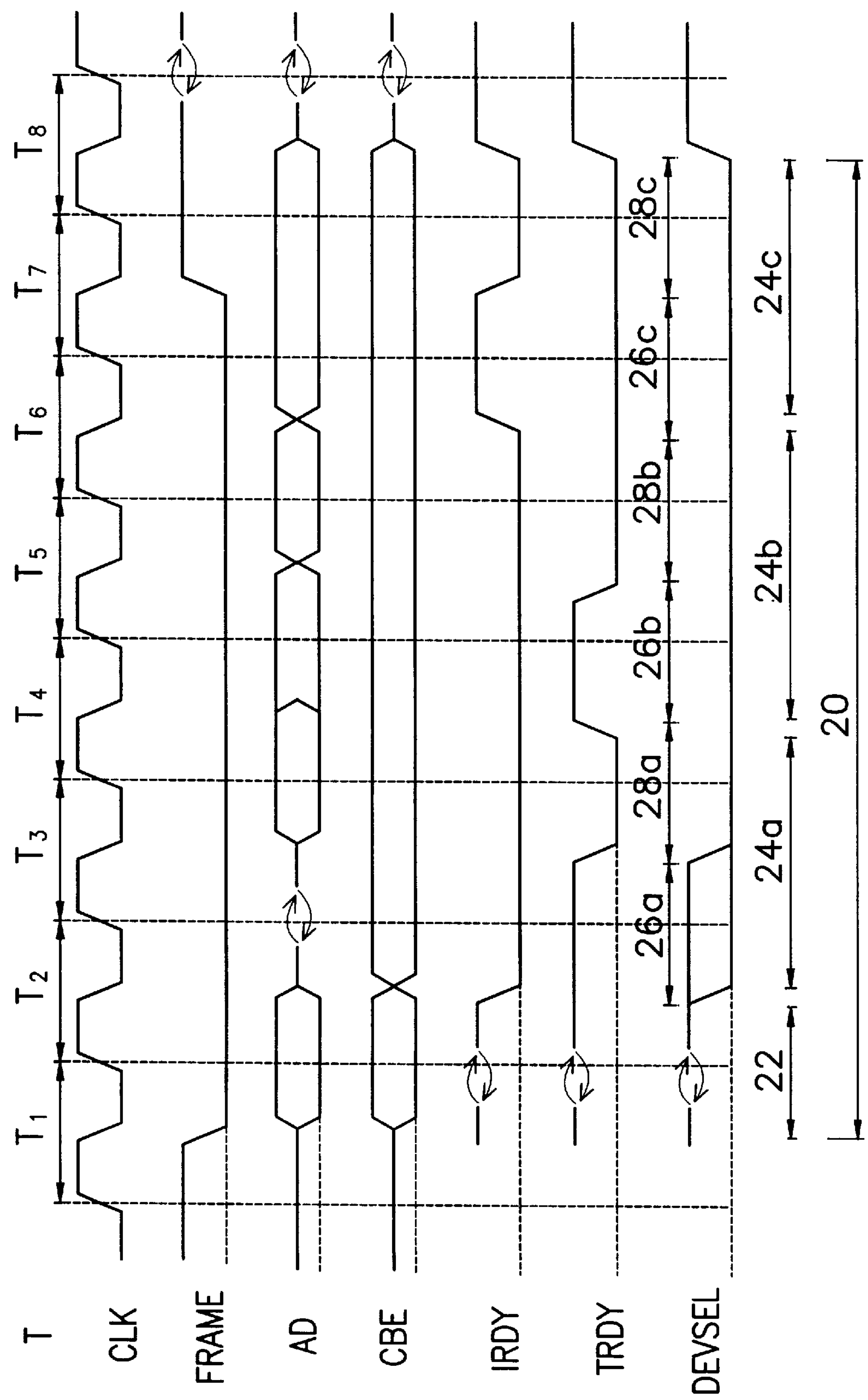
FIG. 2 is a timing diagram showing the sequence of events at a PCI bus interface during a read operation.

Reference will now be made in detail to the present preferred embodiments of the invention, examples of which are illustrated in the accompanying drawings. Wherever possible, the same reference numbers are used in the drawings and the description to refer to the same or like parts.

Figure 3:
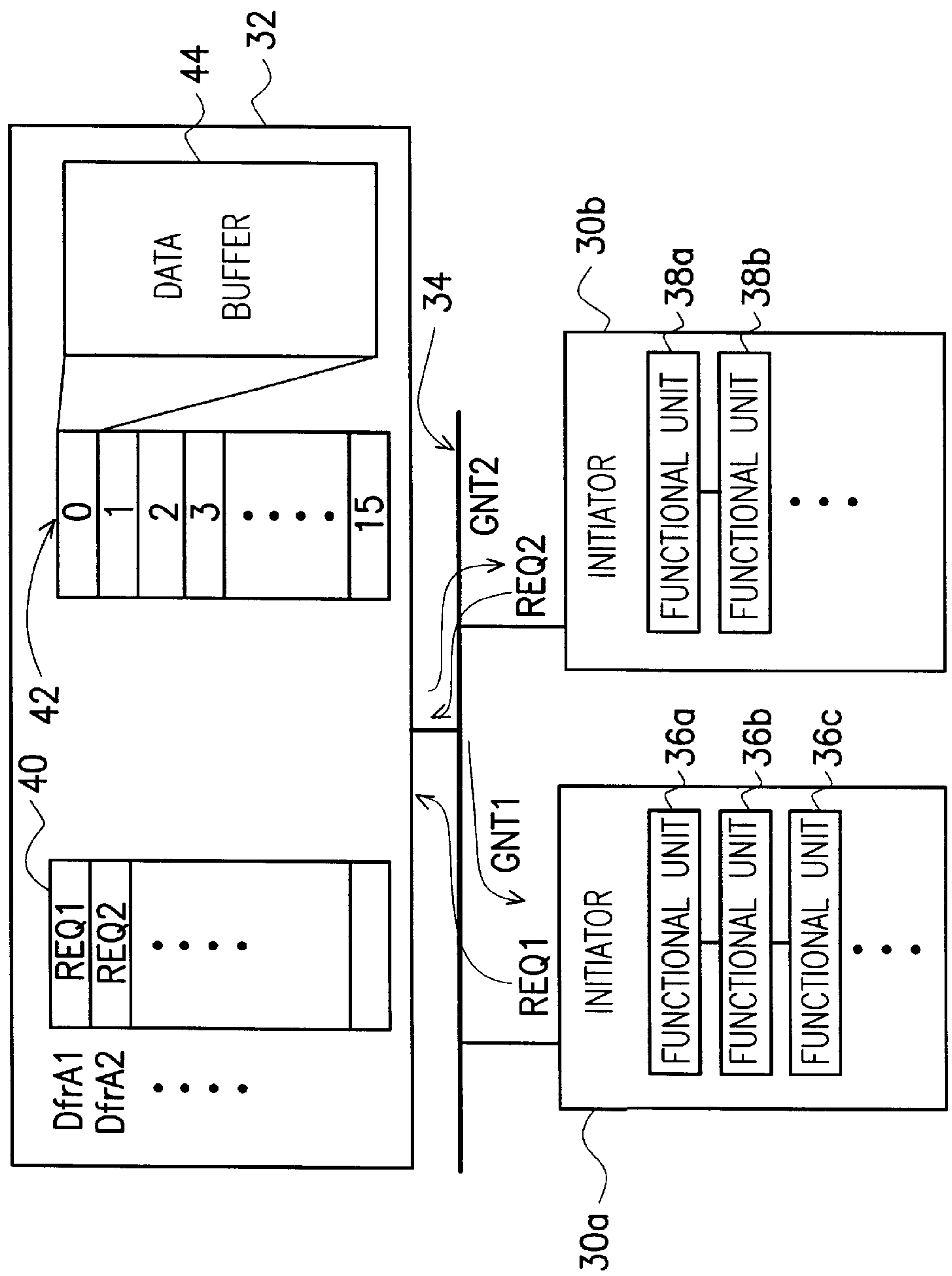
FIG. 3 is a block diagram showing the circuitry of a PCI system that can perform delayed transaction according to a first embodiment of this invention.

FIG. 3 is a block diagram showing the circuitry of a bus system that can perform delayed transaction according to a first embodiment of this invention. A peripheral component interconnect (PCI) bus is, for example, used for descriptions. The bus system is not limited to the PCI bus. The circuitry components include a first initiator 30*a*, a second initiator 30*b* and a responder 32. All of the components are coupled to a bus, such as a PCI bus 34. The initiators 30*a* and 30*b* can be any PCI compatible master controllers including, for example, a LAN adapter, an expansion bus bridge and SCSI host bus adapter. The responder 32 can be a host bridge that is capable of bus arbitration function such as the north bridge of a computer chipset. Each of the initiators 30*a* and 30*b* can have a plurality of functional units, and each of them can submit a request. REQ signal such as REQ1 and REQ2 requesting the use of the PCI bus 34. On the other hand, the responder 32 is capable of issuing grants GNT1 and GNT2 to the initiators 30*a* and 30*b* subjected to the state of the PCI bus 34. For example, grant signal GNT1 is sent to the initiator 30*a* while grant signal GNT2 is sent to the initiator 30*b* so that they can ultimately use the PCI bus 34.

Once the computer system is activated, each PCI compatible peripheral components that couple to the PCI bus 34 (such as the initiators 30*a* and 30*b* as shown in FIG. 3) can request a fixed amount of memory space. 1 MB of memory space can be assigned to each of the peripheral component as its defer address through the basic input/output subsystem (BIOS). At the same time, the BIOS must process the addresses of each initiator (30*a* and 30*b*)and then storing the addressing information in the responder 32.

When the responder accepts the request from an initiator such as 30*a* but unable to respond to the request of the initiator soon enough, the responder 32 will generate a defer identifier DID that corresponds to the initiator 30*a*. The defer identifier DID further includes a defer address DfrA and a buffer identifier buffer_id. The defer address DfrA corresponds to the initiator 30*a* and the buffer identifier buffer_id corresponds to one of the transaction processing operations within the responder 32. The buffer_id must be stored in the initiator 30*a*. For example, four of the address lines [3:0] can be used to form four bits of the buffer identifier buffer_id required to support 16 outstanding transactions.

When the initiator 30*a* sends out a request REQ1 for using the PCI bus 34, a response signal will be returned by the responder 32 if the required data is not ready yet. The response signal for the PCI system is, for example, a stop signal STOP. In the meantime, the responder 32 will also send out a defer identifier DID through the address/data bus AD. The defer identifier DID includes a defer address DfrA and a buffer identifier buffer_id. The defer address DfrA corresponds to the initiator 30*a*, and the buffer identifier buffer_id corresponds to one of the transaction processing operations carried out inside the responder 32. The responder 32 further contains a transaction queue 42 such that each buffer identifier buffer_id corresponds to a particular transaction processing operation. Furthermore, each buffer identifier buffer_id also has a data buffer 44 for storing the data requested by the initiator. As soon as the required data are in the data buffer 44 and ready to submit to the initiator 30*a*, the responder 32 will issue the defer identifier DID. On picking up the defer identifier DID, the initiator 30*a* will start preparing for receiving the incoming data. When the initiator 30*a* is ready, data are sent from the responder 32 to the initiator 30*a* via the PCI bus 34.

From the aforementioned description, it is easy to notice that the spirit of this invention lies in the target device acting like a master controller when data need to be returned to the initiator. In the operation of a conventional delayed transaction, there is no defer identifier DID. Since the initiator does not know when the target device is ready to transmit data, the initiator has to poll the target device constantly. This will lead to the under-utilization of the bus. However, the target device of this invention is capable of signaling to the initiator when the data is ready. Hence, the initiator only has to issue a request to the target device once because the target device will generate a defer identifier DID to facilitate subsequent transaction.

In the following, a few examples are used to explain the delayed transaction performed by the PCI system of this invention. These examples are selected to present an overall picture of its specific use, and should not be use to restrict the scope of this invention. In the embodiments that follow, the PCI system is explained with respect to read operations. However, anyone familiar with the technology can equally apply the method to any write operations.

Figures 4, 5:
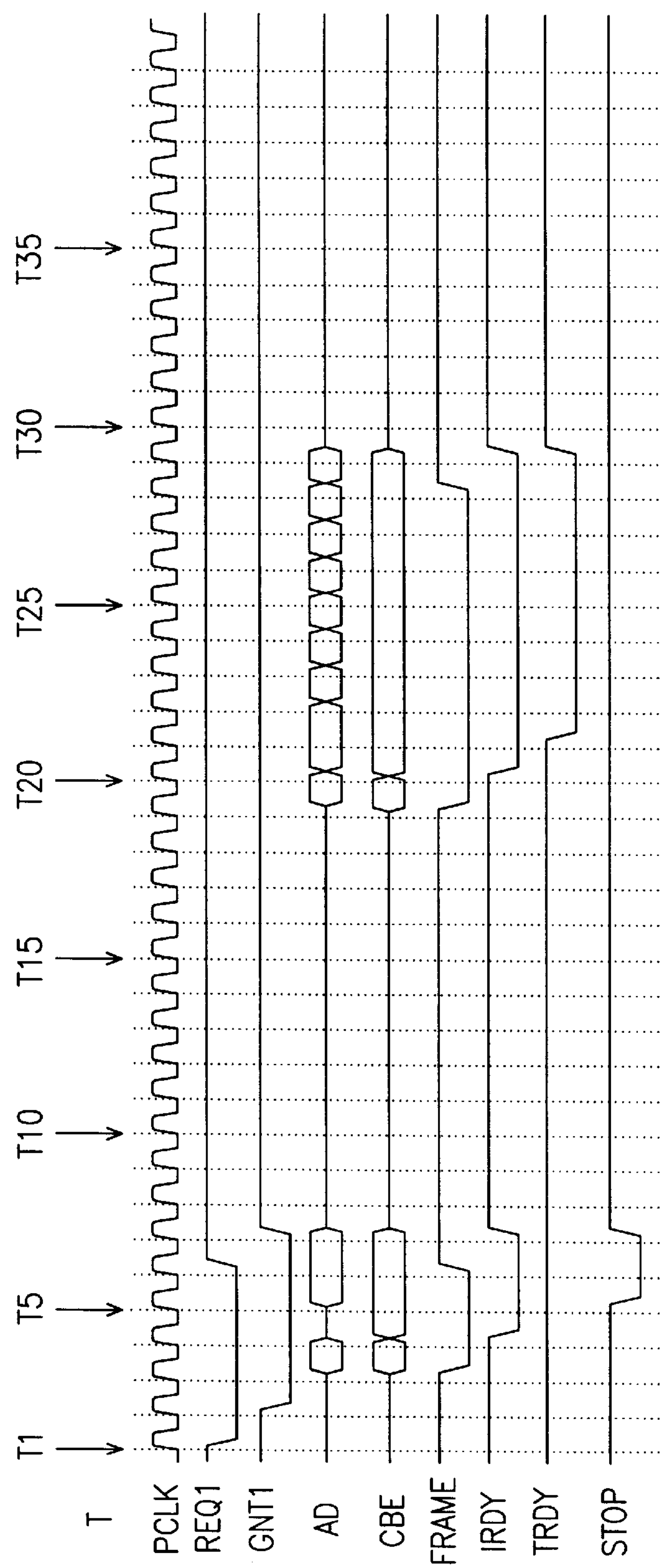
FIG. 4 is a timing diagram of various signals in a PCI system working under a defer access mode through the PCI bus according to this invention.
FIG. 5 is an example illustrating typical address bit assignment of a defer identifier DID that needs to be used in a defer retry cycle according to the method of this invention.

FIG. 4 is a timing diagram of various signals in a PCI system working under a defer access mode through the PCI bus according to this invention.

First, in cycle T1, the initiator 30*a* sends out a request REQ1 signal requesting the use of the PCI bus 34 for accessing data in the responder 32 (target device). In cycle T2, the responder 32 issued a grant GNT1 signal accepting the request from the initiator 30*a*. In cycle T3, the initiator 30*a* sends out a FRAME signal so that transaction can begin. Next, an address is put on the address/data bus AD for targeting the responder 32. At the same time, a read instruction is sent to the responder 32. If the responder 32 is unable to respond immediately to the request of the initiator 30*a*, it will generate a defer identifier DID that corresponds to the initiator 30*a*. The defer identifier DID includes a defer address DfrA and a buffer identifier buffer_id. In cycle T5, the responder 32 will send out a stop signal STOP and then put the defer identifier DID up on the address/data bus AD. The defer identifier DID is a sign to the initiator 30*a* that the responder 32 will carry out a passive delayed transaction. This particular cycle is known as a defer retry cycle. Once the responder 32 issued the stop signal STOP and the defer identifier DID, the initiator 30*a* will record the buffer identifier in the defer identifier DID during cycle T6. In addition, the FRAME signal and the IRDY signal issued by the initiator 30*a* will return to the normal high level, thereby releasing the control of the bus 34. Now, the initiator 30*a* is in a data-waiting mode. In the meantime, the responder 32 will begin to carry out a series of internal access operations starting in cycle T7. As soon as the responder 32 has retrieved the data required by the initiator 30*a*, the responder 32 will issue a FRAME signal and the defer identifier DID in cycle T19. On sensing a defer identifier DID on the bus, the initiator 30*a* will compare the identifier on the bus with its own defer address and previously recorded buffer identifier buffer_id. If both of them match, the initiator 30*a* will prepare itself for receiving the data. When the initiator 30*a* is ready to receive data, a target ready TRDY signal will be issued so that data can be transferred from the responder 32 to the initiator 30*a*.

According to the above description, a complete delayed transaction cycle actually comprises of a defer retry cycle and a data acquisition cycle. The defer retry cycle starts from the moment when the initiator requests for the use of the PCI bus and the responder accepts the request but unable to respond immediately until the responder generates a corresponding defer identifier and then sends the identifier out along with a stop signal. The data acquisition cycle starts from the moment when the responder has retrieved the requested data until data is completely transferred from the responder to the initiator.

FIG. 5 is an example illustrating typical address bit assignment of a defer identifier DID that needs to be used in a defer retry cycle according to the method of this invention. In the defer identifier DID, the number of bits used for the buffer identifier buffer_id should reflect the maximum number of in-process items capable of being hold by the data queue in the target device (the responder). In the example, four bits [3:0] are used to represent the buffer identifier buffer_id. Normally, for a multimaster system that follows the PCI specification, a 16-line data queue is a suitable length. Bits [9:4] of the defer identifier DID are reserved for future expansion. Bits [19:12] of the defer identifier DID are used to store the expected time delay. Finally, the responder is using the delay address in bits [31:20] of the defer identifier DID for requesting passive delayed transaction. In general, for an initiator that does not have separate functional units, defining a buffer identifier buffer_id is irrelevant. However, if the initiator has several functional units, the buffer identifier buffer_id is very useful. The initiator can transfer data back to the corresponding functional unit according to the code recorded within the buffer identifier buffer_id.

Figure 6:
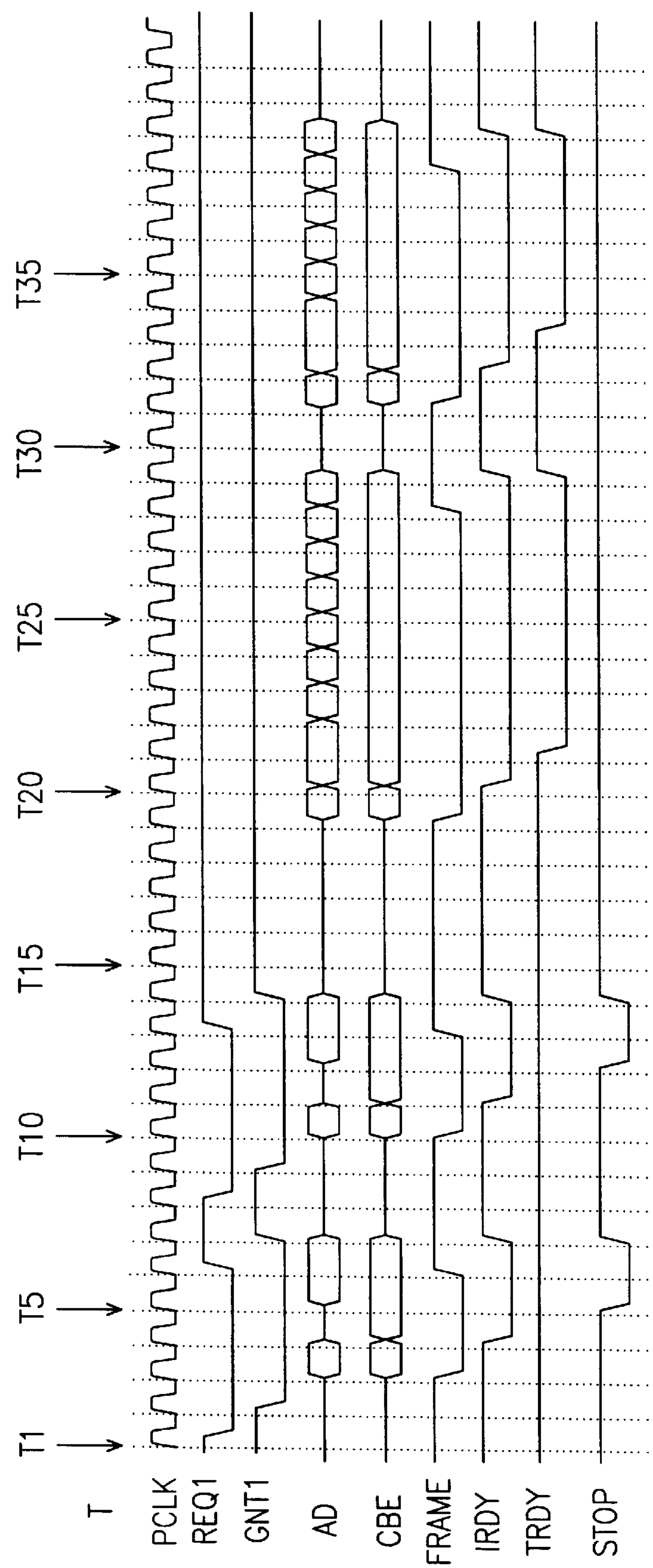
FIG. 6 is a timing diagram of various signals in a PCI system working under a multiple defer access mode through the PCI bus according to this invention.

FIG. 6 is a timing diagram of various signals in a PCI system working under a multiple defer access mode through the PCI bus according to this invention.

First, in cycle T1, the initiator 30*a* sends out a first request $\mathbf{REQ1}_{1st}$ signal requesting the use of the PCI bus 34 for accessing data in the responder 32 (target device). In cycle T2, the responder 32 issued a grant GNT1 signal accepting the request from the initiator 30*a*. In cycle T3, the initiator 30*a* sends out a FRAME signal so that transaction can begin. Assume that the responder 32 is unable to respond immediately to the first request $\mathbf{REQ1}_{1st}$ of the initiator 30*a*, it will generate a first defer identifier DID1 that corresponds to the initiator 30*a*. The first defer identifier DID1 includes a defer address DfrA that corresponds to the initiator 30*a* and a first buffer identifier buffer_id1 that corresponds to the request $\mathbf{REQ1}_{1st}$. In cycle T5, the responder 32 will send out a stop signal STOP and then put the first defer identifier DID1 up on the address/data bus AD. Once the responder 32 issued the stop signal STOP and the first defer identifier DID1, the responder 32 will begin to carry out a series of internal access operations to retrieve the data demanded by the first request $REQ1_{1st}$.

In cycle T8, the initiator 30*a* sends out a second request $REQ1_{2nd}$ signal requesting the use of the PCI bus 34 for accessing data in the responder 32 (target device). In cycle T9, the responder 32 issued a grant GNT1 signal accepting the request from the initiator 30*a*. In cycle T10, the initiator 30*a* sends out a FRAME signal so that transaction can begin. Assume that the responder 32 is unable to respond immediately to the second request $REQ1_{2nd}$ of the initiator 30*a*, it will generate a second defer identifier DID2 that corresponds to the initiator 30*a*. The second defer identifier DID2 includes a defer address DfrA that corresponds to the initiator 30*a* and a second buffer identifier buffer_id2 that corresponds to the request $REQ1_{2nd}$. In cycle T12, the responder 32 will send out a stop signal STOP and then put the second defer identifier DID2 up on the address/data bus AD. Once the responder 32 issued the stop signal STOP and the second defer identifier DID2, the responder 32 will begin to carry out a series of internal access operations to retrieve the data demanded by the second request $REQ1_{2nd}$.

As soon as the responder 32 has retrieved the data that corresponds to the first request $REQ1_{2nd}$ submitted by the initiator 30*a*, the responder 32 will issue a FRAME signal during cycle T19. Therefore, data transaction required by the first request $REQ1_{1st}$ begins. At the same time, the responder 32 will also send out the defer address DfrA via the address/data bus AD and memory write instruction via the CBE lines. Besides activating IRDY at T21, the responder 32 sends out the requested data through the AD bus and the first buffer identifier buffer_id1 through the CBE lines. After the initiator 30*a* picks up and compares the defer address on the AD bus with its own DfrA, the DEVSEL (not shown) and the, TRDY signal are issued. Subsequently, the responder 32 begins to transfer the data that correspond to the first request $REQ1_{1st}$ to the initiator 30*a*.

Similarly, when the responder 32 has retrieved the data that correspond to the second request $REQ1_{2nd}$ submitted by the initiator 30*a*, the responder 32 will issue a FRAME signal during cycle T31. Therefore, data transaction required by the second request $REQ1_{2nd}$ begins. At the same time, the responder 32 will also send out the defer address DfrA via the address/data bus AD and memory write instruction via the CBE lines. Besides activating IRDY at T32, the responder 32 sends out the requested data through the AD bus and the second buffer identifier buffer_id2 through the CBE lines. After the initiator 30*a* picks up and compares the defer address on the AD bus with its own DfrA, the DEVSEL and TRDY signals are issued. The responder 32 begins to transfer the data that correspond to the second request $REQ1_{2nd}$ to the initiator 30*a*.

The timing diagram as shown in FIG. 6 can also be used to illustrate the operation of two different initiators such as 30*a* and 30*b*. For example, a first request REQ1 signal can be sent by the first initiator 30*a* while the second request REQ2 signal can be sent by the second initiator 30*b* a little later. Under such circumstances, the first defer identifier DID1 that corresponds to the first initiator 30*a* must include a first defer address DfrA1 and a first buffer identifier buffer_id1, and the second defer identifier DID2 that corresponds to the second initiator 30*b* must include a second defer address DfrA2 and a second buffer identifier buffer_id2. Since the timing operations of various signal lines are very similar, detail description is not repeated here.

In the PCI specification, three methods of reading are defined including general reading (memory read), line reading (memory read line) and multiple line reading (memory read multiple). The initiator can execute all kinds of reading instructions because a line based access method is generally used to request data from a central source (system memory). Therefore, a high system efficiency can be obtained if the process of transferring data from the central source to the initiator can be slightly changed according to the type of reading operation. For example, if the data requested by the initiator are smaller than one data line (8DW), the initiator can issue a stop signal STOP so as to terminate the passive delayed transaction as soon as possible. In other words, the remaining data after the first line of data is read will not be used by the initiator.

Figure 7:
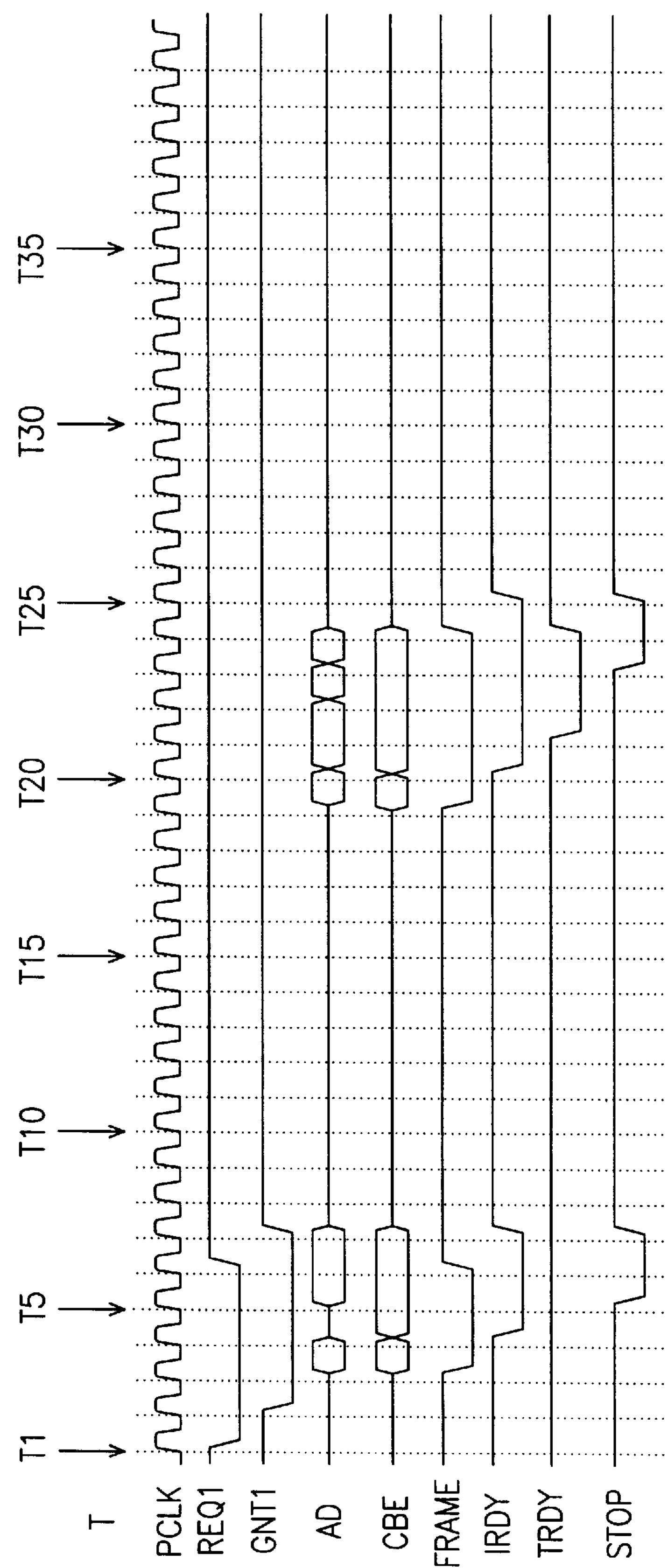
FIG. 7 is a timing diagram of various signals in a PCI system of this invention working under a defer access mode whose target device can provide more data than the initiator actually required.

FIG. 7 is a timing diagram of various signals in a PCI system of this invention working under a defer access mode whose target device has more data than the initiator actually required. In FIG. 7, the initiator 30*a* needs only 3DW of data. Yet, the target device can provide a line of data, that is, 8DW.

First, in cycle T1, the initiator 30*a* sends out a request REQ1 signal requesting the use of the PCI bus 34 for accessing data in the responder 32 (target device). In cycle T2, the responder 32 issued a grant GNT1 signal accepting the request from the initiator 30*a*. In cycle T3, the initiator 30*a* sends out a FRAME signal so that transaction can begin. Next, an address is put on the address/data bus AD for targeting the responder 32. At the same time, a read instruction is sent to the responder 32. If the responder 32 is unable to respond immediately to the request of the initiator 30*a*, it will generate a defer identifier DID that corresponds to the initiator 30*a*. The defer identifier DID includes a defer address DfrA and a buffer identifier buffer_id. In cycle T5, the responder 32 will send out a stop signal STOP and then put the defer identifier DID up on the address/data bus AD. The defer identifier DID is a sign to the initiator 30*a* that the responder 32 will carry out a passive delayed transaction. Once the responder 32 issued the stop signal STOP and the defer identifier DID, the initiator 30*a* will record the buffer_id in the defer identifier DID during cycle T6. In addition, the FRAME signal and the IRDY signal issued by the initiator 30*a* will return to the normal high level, thereby releasing the control of the bus 34. Now, the initiator 30*a* is in a data-waiting mode. In the meantime, the responder 32 will begin to carry out a series of internal access operations starting in cycle T7.

As soon as the responder 32 has retrieved the data requested by the initiator 30*a*, the responder 32 will issue a FRAME signal so that data transmission with respect to the initiator 30*a* can begin. At much the same time, the responder 32 will also send out the defer address DfrA through the address/data lines AD as well as the memory write instruction through the CBE lines. In cycle T20, the responder will send out an IRDY signal and the CBE lines will send out the buffer identifier buffer_id. On sensing a defer identifier DID on the PCI bus, the initiator 30*a* will compare the identifier on the bus with its own defer address and its previously recorded buffer identifier buffer_id. If both of them match, the initiator 30*a* will send out the DEVSEL and the TRDY signal. Hence, data can now be transferred from the responder 32 to the initiator 30*a*.

When the initiator 30*a* has received enough data, the initiator 30*a* will automatically emit a stop signal so that the data transmission between the initiator 30*a* and the responder 32 is terminated immediately. As shown in FIG. 7, since the initiator 30*a* requires only 3DW of data while the responder 32 has prepared 8DW of data, the remaining 5DW of data will not be read by the initiator 30*a*. Therefore, when the initiator 30*a* has finished reading the first 3DW of data in cycle T23, a stop STOP signal is issued during the next cycle. Thus, data transmission is terminated promptly. In fact, the stop signal STOP is issued only after the final TRDY is issued.

In general, whenever the data required by the initiator is less than the data retrieved by the target device, a stop signal STOP can be emitted by the initiator to cut short the data transaction. The stop signal can be emitted any time after the last TRDY signal is issued. Once the data transmission terminates, the PCI bus is freed to do other jobs. Hence, efficiency of the system is improved.

Figure 8:
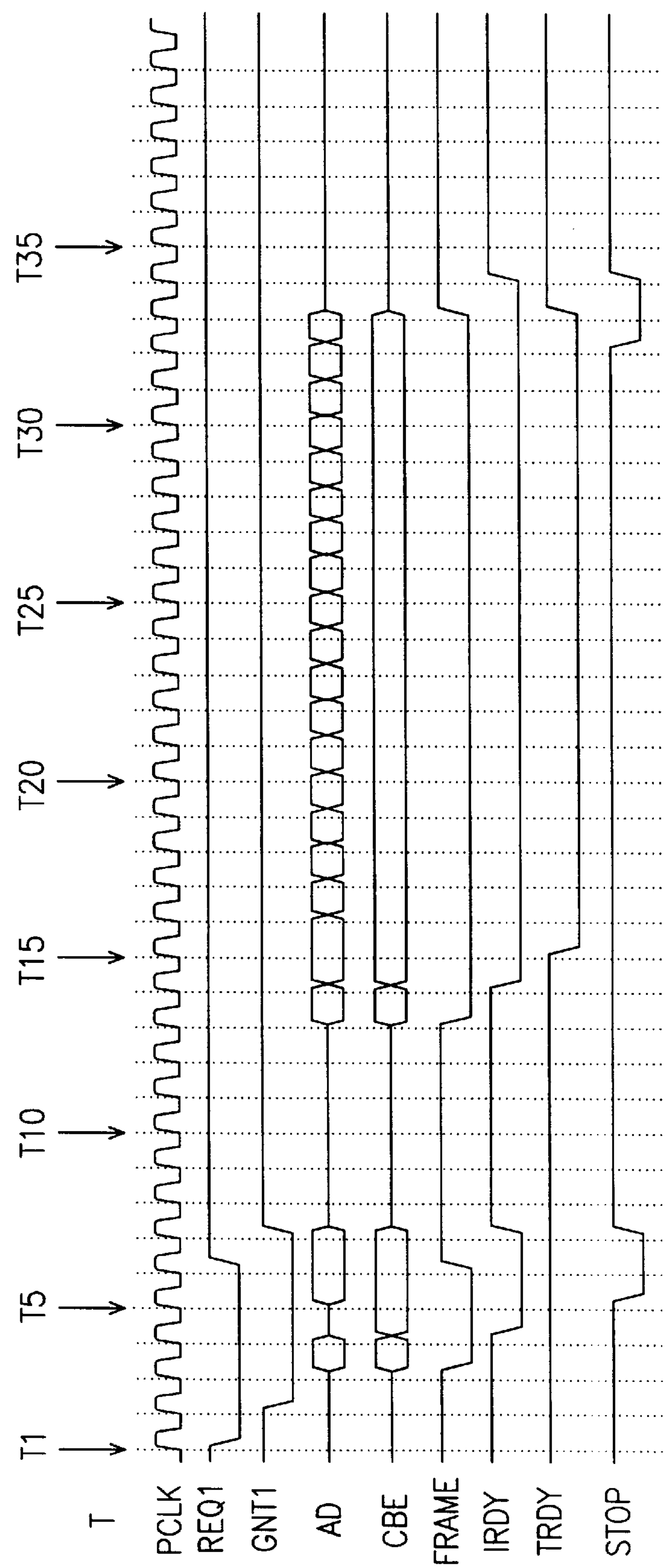
FIG. 8 is a timing diagram of various signals in a PCI system working under a defer access mode according to this invention with the initiator issuing a multiple of read instructions via the PCI bus.

FIG. 8 is a timing diagram of various signals in a PCI system working under a defer access mode according to this invention with the initiator issuing a memory read multiple instructions via the PCI bus. Assume that the initiator 30*a* issues a memory read multiple instructions to initiate a passive delayed transaction, the target device will continue to retrieve data from a central source until a stop signal is issued by the initiator 30*a* to terminate the transaction. However, as shown in FIG. 8, the initiator 30*a* needs only two lines of data, but the target device continues to fetch data from the central source before the stop signal is out. With respect to the initiator 30*a*, the third and the fourth line of data retrieved by the target device can be discarded. Hence, no attempt is made to return those data to the initiator 30*a*.

In cycle T11, data that correspond to the defer identifier DID is ready. At the same time, the responder 32 starts to access the second line of data. When the responder 32 is ready to respond to the request of the initiator 30*a*, the responder 32 issues a FRAME signal in cycle T13. In the meantime, the responder 32 also sends out a defer address DfrA via the address/data lines AD and a memory write instruction via the CBE lines. Next, in cycle T14, the responder 32 will forward an IRDY signal and a buffer identifier buffer_id via the CBE lines. After the initiator 30*a* picks up the defer identifier DID and finds it matches its own copy, the initiator 30*a* issues a DEVSEL (not shown) and a TRDY signal in cycle T15. Hence, data can now be transferred from the responder 32 to the initiator 30*a*. Then, in cycle T19, the second line of data is ready and the target device starts to access the third line of data. In cycle T28, the third line of data is ready and the target device starts to access the fourth line of data.

Since the initiator 30*a* actually requires only two lines of data, the initiator 30*a* sends out a stop signal STOP in cycle T32 for terminating the data transaction. As soon as the stop signal is issued, the third and the fourth line of data are discarded.

For a passive delayed transaction, a system is regarded as fully loaded when the internal data buffer 44 (as shown in FIG. 3) inside the responder 32 is full, or the central source (such as the memory system) is temporarily inaccessible. Since the responder 32 is unable to perform internal access under such circumstances, it must inform the initiator 30*a* to issue request signal inquiring about the readiness of the data later. To achieve this goal, the responder 32 has to issue an invalid defer address (invalid DfrA) to the initiator 30*a* together with the stop signal.

Figure 9:
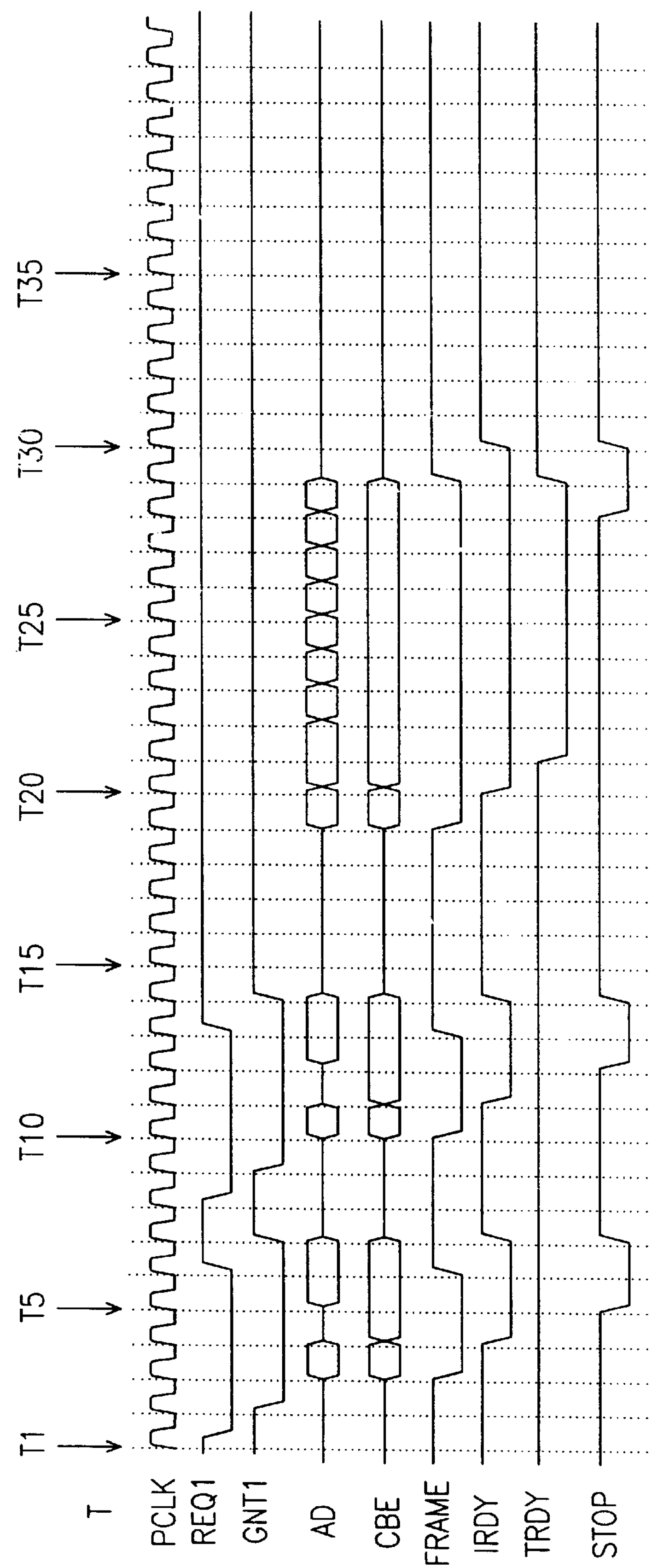
FIG. 9 is a timing diagram of various signals in a PCI system working under a defer access mode according to this invention under the situation that initiator's request is rejected by the responder and hence the initiator has to re-issue a request signal.

FIG. 9 is a timing diagram of various signals in a PCI system working under a defer access mode according to this invention under the situation that initiator's request is rejected by the responder and hence the initiator has to re-issue a request signal.

First, in cycle T1, the initiator 30*a* sends out a request REQ1 signal requesting the use of the PCI bus 34 for accessing data in the responder 32 (target device). In cycle T2, the responder 32 issued a grant GNT1 signal accepting the request from the initiator 30*a*. In cycle T3, the initiator 30*a* sends out a FRAME signal so that transaction can begin. Next, an address is put on the address/data bus AD for targeting the responder 32. At the same time, a read instruction is sent to the responder 32. If the responder 32 is unable to accept the request from the initiator 30*a*, the responder 32 will have to issue an invalid defer identifier informing the initiator 30*a* that it must issue the request signal again. In cycle T5, the responder 32 issues a stop signal STOP and an invalid defer identifier via the address/data bus AD at the same time.

In cycle T8, the initiator 30*a* sends out a request REQ1 signal to the responder 32 for accessing data via the PCI bus again. In cycle T9, the responder 32 issued a grant GNT1 signal accepting the request from the initiator 30*a*. In cycle T1 1, the initiator 30*a* sends out a FRAME signal so that transaction can begin. Next, an address is put on the address/data bus AD for targeting the responder 32. At the same time, a read instruction is sent to the responder 32. If the responder 32 is able to accept the request of the initiator 30*a* but cannot respond in time, the responder 32 then generates a defer identifier DID that corresponds to the initiator 30*a*. The defer identifier DID includes a defer address DfrA and a buffer identifier buffer_id. In cycle T12, the responder 32 will send out a stop signal STOP and then put the defer identifier DID up on the address/data bus AD. The defer identifier DID is a sign to the initiator 30*a* that the responder 32 will carry out a passive delayed transaction. Once the responder 32 issued the stop signal STOP and the defer identifier DID, the FRAME signal and the IRDY signal originated by the initiator 30*a* will return to the normal high level in cycle T14, thereby releasing the control of the bus 34. Now, the initiator 30*a* is in a data-waiting mode. In the meantime, the responder 32 will begin to carry out a series of internal access operations starting in cycle T14.

As soon as the responder 32 has retrieved the data required by the initiator 30*a*, the responder 32 will issue a FRAME signal in cycle T19 so that corresponding data transfer with the initiator 30*a* can begin. At the same time, the responder 32 also sends out the defer address DfrA through the address/data lines AD and the memory write instruction through the CBE lines. Besides activating IRDY in cycle T20, the responder 32 send out the requested data through the AD bus and the buffer identifier buffer_id through the CBE line. After receiving the defer identifier DID from the AD bus and finding that there is a match with its own copy, the initiator 30*a* will issue the DEVSEL and the TRDY signal in cycle T21. Hence, data can now be transferred from the responder 32 to the initiator 30*a*.

As soon as sufficient data are received, the initiator 30*a* will send out a stop signal STOP in cycle T28. The stop signal will terminate the data transmission between the initiator 30*a* and the responder 32.

The few examples above serve to illustrate the PCI system according to this invention reading data from a responder to a PCI compatible device such as an initiator under a defer access mode of operation. It can be noticed that the PCI system of this invention has initiator (acting as the master controller of the PCI system) that submit a data request signal only once. As soon as the requested data are ready, the target device (a responder, such as the north bridge portion of a computer system) is able to return the requested data to the requesting initiator automatically with the help of a defer identifier DID.

Since the initiator does not have to send out request signal repeatedly just to inquire whether the target device is ready for data transmission, there is no need for the initiator to occupy the PCI bus. Hence, the PCI bus is free to carry out data transaction requested by another initiator or data transaction requested by a different functional unit within the same initiator. Thus, efficiency of the PCI system is improved.

Figure 10:
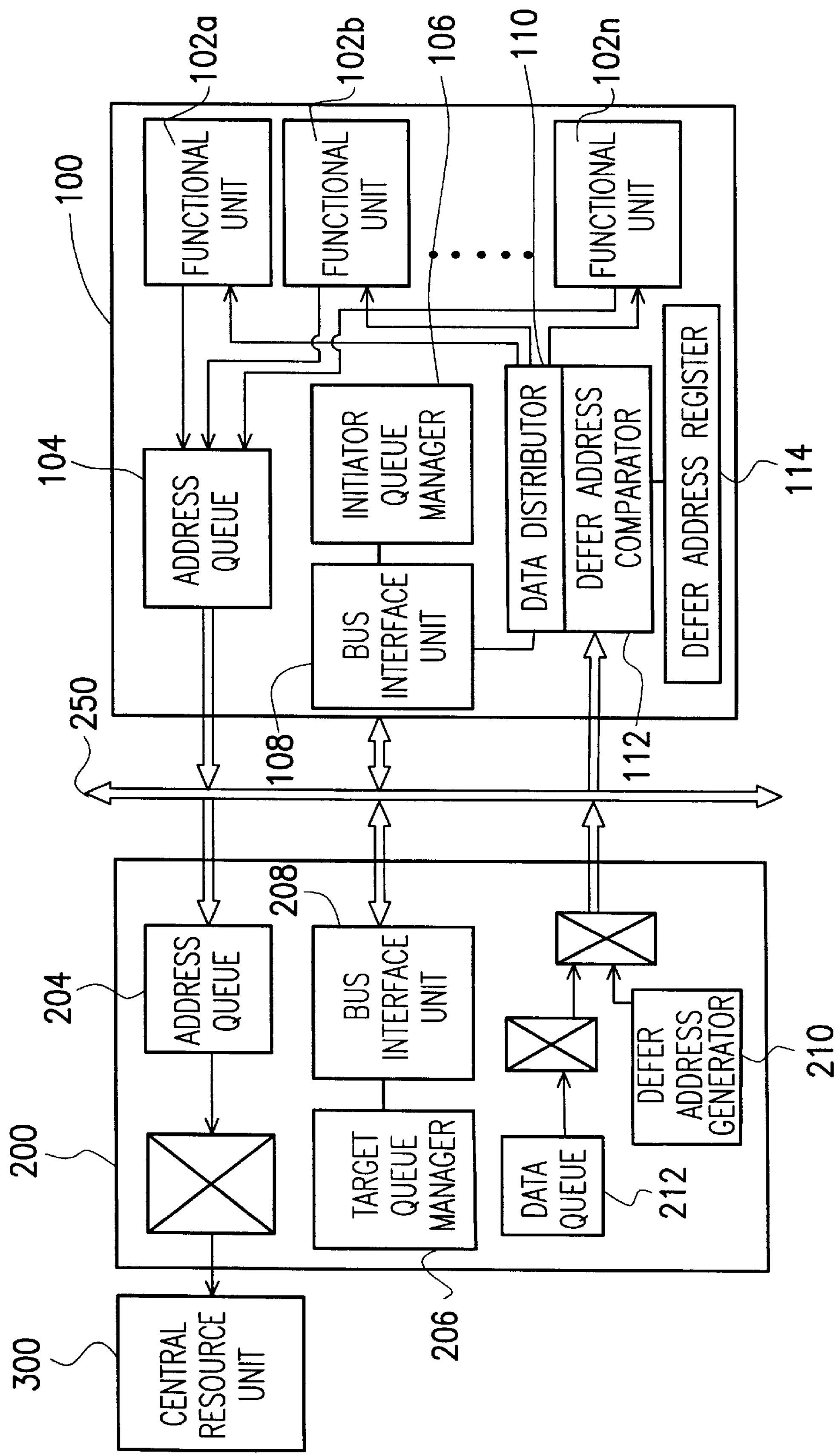
FIG. 10 is a block diagram showing the circuitry of a PCI system that can perform delayed transaction with PCI compatible device according to a second embodiment of this invention.

FIG. 10 is a block diagram showing the circuitry of a PCI system that can perform delayed transaction with PCI compatible device according to a second embodiment of this invention.

As shown in FIG. 10, a functional unit such as 102*a* inside the initiator 100 is capable of sending out a request for using the PCI bus 250. Next, the address queue 104 and the initiator queue manager 106 will emit a request REQ signal to the arbiter of the PCI bus according to the request of the functional unit 102*a*. A responder 200, which lies between a central resource unit 300 and the PCI bus 250, acts as an arbiter. Assume that the responder (target device) 200 accepts the request from the initiator 100, the responder will return a grant GNT signal to the initiator 100. Thereafter, the initiator 100 will issue a FRAME signal and a read instruction for initiating the data transaction operation. Next, the responder 200 will retrieve address information from the address/data bus (AD bus), and then its bus interface unit (BIU) 208 will issue a stop signal STOP for delaying the data transaction cycle.

In the meantime, the defer identifier generator 210 within the responder 200 will generate a defer identifier DID. The defer identifier DID includes a defer address DfrA and a buffer identifier buffer_id as well as some other information as shown in FIG. 5. When the data queue 212 is fully loaded, the defer identifier generator 210 will complement some of the bits in the defer address DfrA. Hence, an invalid identifier that could not possibly match the recorded identifier in the initiator 100 is produced. The bus interface unit (BIU) 208 will normally abide by the PCI bus specification (version 2.1). Hence, the BIU is generally a PCI master controller/target device compatible controlling device.

Concurrently, the target queue manager 206 inside the responder 200 will issue a request to the central resource unit 300 (for example, the system memory). When the requested data has returned to the responder 200, the target queue manager 206 will initiate a memory write cycle using the defer address DfrA generated by the defer address generator 210. If the defer address comparator 112 finds that the defer address DfrA on the AD bus matches with its own DFRA, the initiator 100 will issue a device select DEVSEL signal claiming itself to be the owner of the defer address. The device select DEVSEL signal is designed according to standard PCI specification (version 2.1). Thereafter, the data transfer cycle of a passive delayed transaction begins.

About this time, the target queue manager 206 and the bus interface unit 208 inside the responder 200 start to transmit data from the data queue 212 to the AD bus. Ultimately, the data are transferred to the bus interface unit 108 of the initiator 100 via the PCI bus 250. Next, the data distributor 110 will forward the received data to the corresponding function unit according to the buffer_id. Hence, the data can be transferred to the correct functional unit, for example, the functional unit 102*a*.

In this embodiment, the bus interface unit 108 of the initiator 100 and the bus interface unit 208 of the responder 200 should operate according to standard PCI specification. However, since both bus interface units 108 and 208 must also work cooperatively with the data queue managers 106 and 206 respectively, data transaction in those bus interface units 108 and 208 have to follow the timing sequence as shown in FIGS. 6 to 9. In other words, the two units 108 and 208 must carry out the delayed transaction according to the PCI system of this invention.

In addition, it is not necessary for the capacity of the address queue 204 in the responder 200 to be the same as the capacity of the address queue 104 in the initiator 100. However, it is generally preferable for the address queue 204 of the responder 200 to have a capacity bigger than the address queue 104 in the initiator 100. This is because the responder 200 will normally serve as the manager of the central resource unit, for example, the north bridge controlling unit of a chipset. Therefore, the responder 200 is the main controller controlling the system's memory. On the contrary, there may be a number of initiators all tapping onto the PCI bus.

To ensure that each initiator (master controller) can use the PCI bus equally, the address queue 204 inside the responder 200 must have a storage capacity larger than the address queue 104 inside each initiator.

The above example illustrates one of the possible hardware structures for carrying out the passive delayed transaction using a PCI system of this invention. In practice, however, the actual circuitry should be designed according to the type of system using the invention. Hence, the aforementioned embodiment should not be construed as a restriction of its applications.

Figure 11:
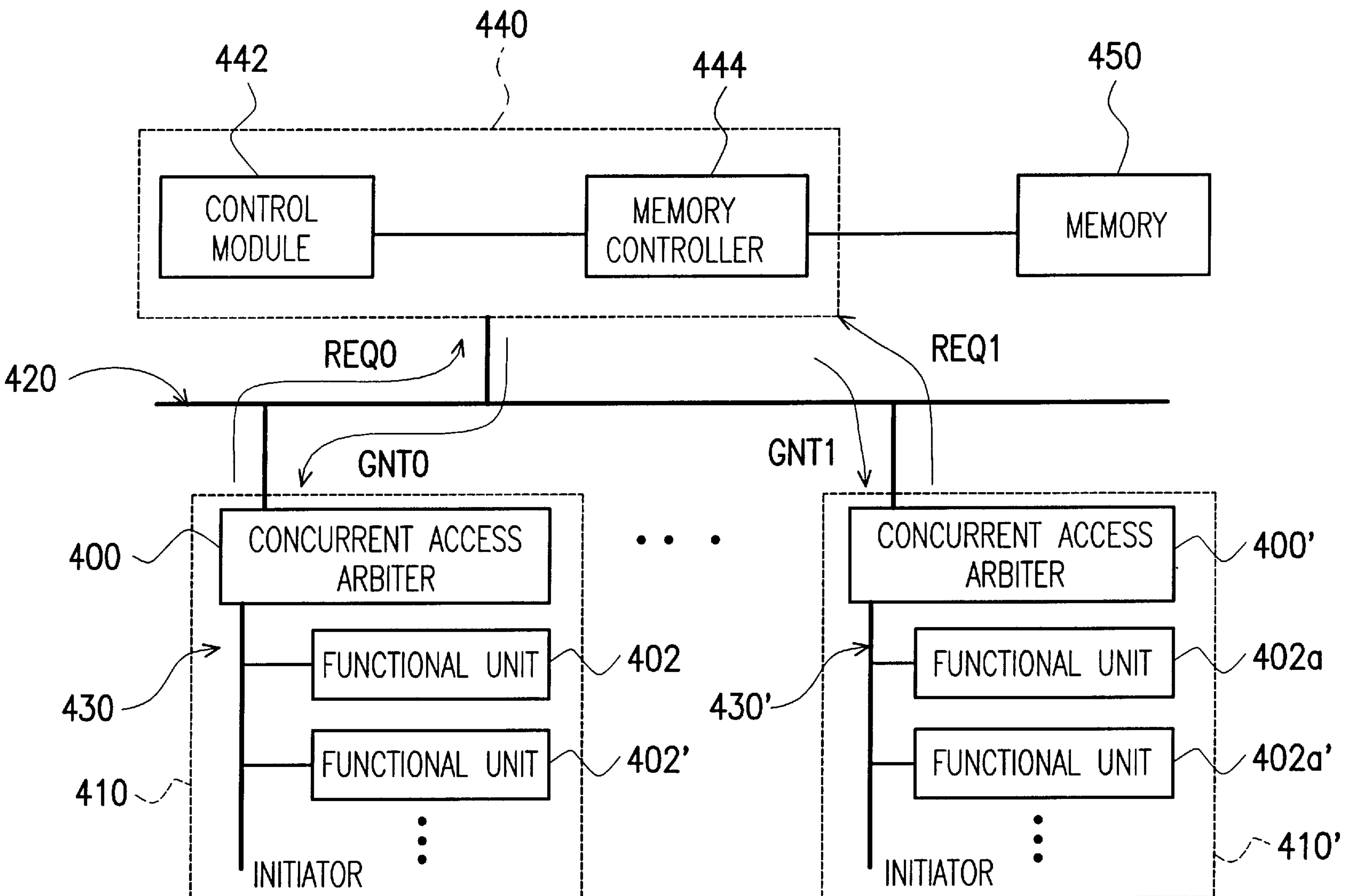
FIG. 11 is a block diagram showing the circuitry of a PCI system that can perform delayed transaction with PCI compatible devices according to a third embodiment of this invention.

FIG. 11 is a block diagram showing the circuitry of a PCI system that can perform the passive delayed transaction with PCI compatible devices according to a third embodiment of this invention.

As shown in FIG. 11, the PCI bus 420 in the PCI system of this invention is capable of working in a defer access mode. Moreover, the PCI bus 420 should agree with the PCI specification. A number of initiators such as 410 and 410' are attached to the PCI bus 420. Each initiator (such as 410) contains a concurrent access arbiter (CAA) that operates according to the PCI system of this invention. The initiator can be any master controller that is compatible to the PCI system. Furthermore, each initiator (for example, 410) can include a plurality of functional units 402. In general, each functional unit such as 402 can be connected according to PCI specification (for example, version 2.1) 430. Alternatively, other types of interface 43' such as ISA or EISA can be used for the connection. The initiator 410 includes an arbiter that can process the incoming data and decide which functional units such as 402 and 402' should go to.

A responder 440 is also coupled to the PCI bus 420. The responder 440 is capable of receiving request signals such as REQ0 from the initiator 410 and then returning a grant GNT0 signal to the initiator 410. During the operation of a delayed data transaction, the controlling module 442 of the responder 440 can control the memory controller 444 so that the memory 450 can be accessed. In the meantime, the controlling module 442 is also capable of generating a defer identifier DID whenever the responder 440 is unable to respond to the request from the initiator 410 immediately. The defer identifier DID includes a defer address DfrA and a buffer identifier buffer_id. The defer address DfrA should correspond to the initiator 410 while the buffer identifier buffer_id should correspond to one of the in-process data operations inside the responder 440.

Figure 12:
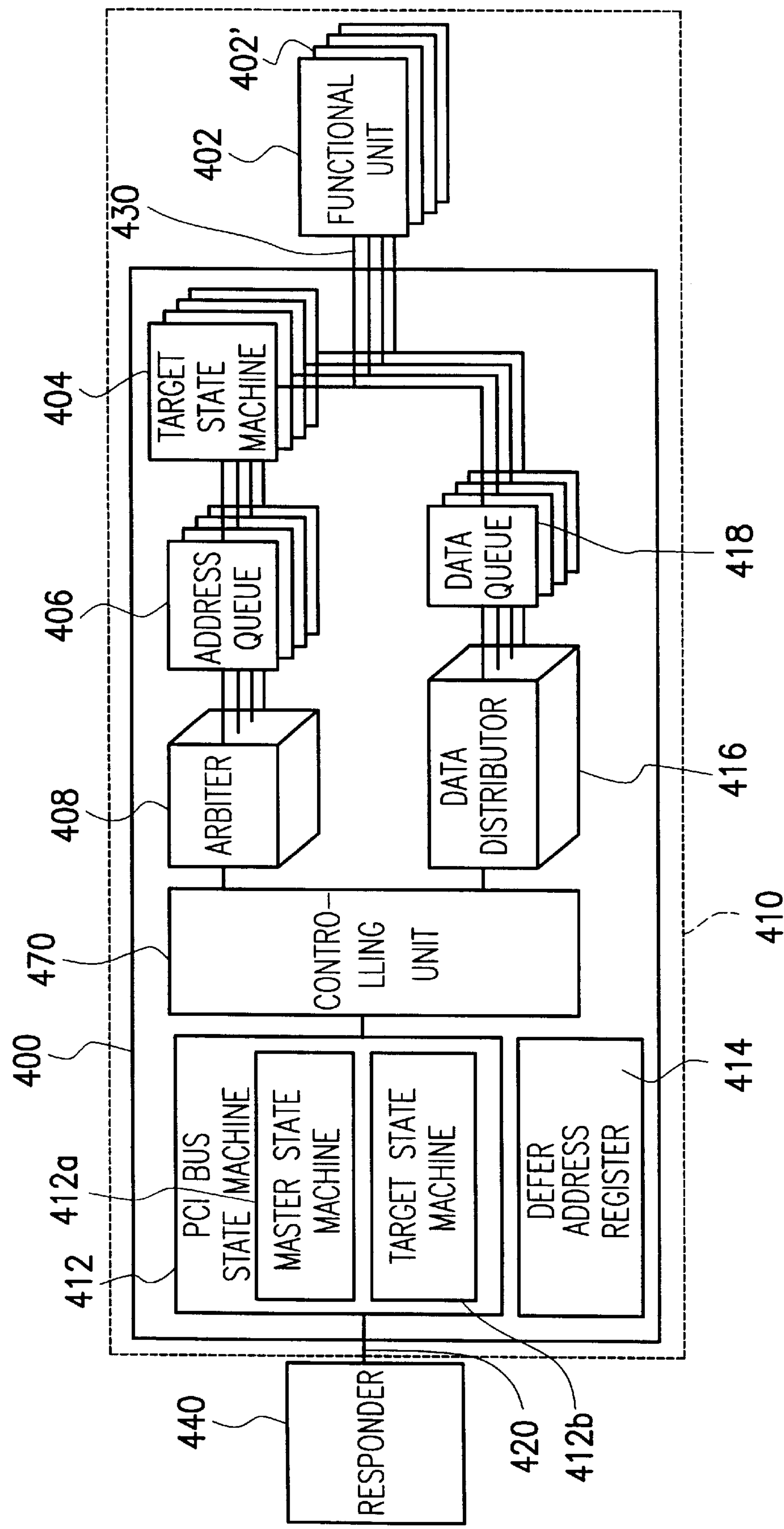
FIG. 12 is a block diagram showing the internal structure of the concurrent access arbiter (CAA) as shown in FIG. 11.

FIG. 12 is a block diagram showing the internal structure of one of the concurrent access arbiters CAA 400 as shown in FIG. 11. The CAA 400 is a type of controller inside the initiator (or PCI compatible main controller) 410.

As shown in FIG. 12, a PCI bus connects the initiator 410 with the responder 440. The responder 440 can be the north bridge controlling unit of a chipset inside a computer system. The responder 440 is able to control system memory. The initiator 410 can have a plurality of functional units 402 that are coupled to the CAA 400 using a PCI bus 430.

The CAA 400 has a controlling unit 470 that controls the operation of some interconnected devices, including a target state machine 404, an address queue 406, an arbiter 408, a PCI bus state machine 412, a defer address register 414, a data distributor 416 and a data queue 418. If the functional unit 402 does not interface with the CAA 400 using PCI queue specification, the target state machine 404 may need to be modified. The PCI bus state machine 412 further includes a master state machine 412*a* and a target state machine 412*b*. In this embodiment, the functional unit 402 is assumed to connect to the CAA 400 using a PCI interface 430.

When the functional unit 402 issues a data request, the CAA 400 acts like a target device while the functional unit 402 acts like a master device. As data transaction begins, the target state machine 404 will record the states of the data transfer operations in the address phase and the data phase. The target state machine 404 will also record other related states (according to PCI specification) as well. Addresses issued during the address phase will be stored in the address queue 406.

Next, the initiator 410 will issue a data request signal to the responder 440 according to the request submitted by the functional unit 402. At this stage, the initiator 410 acts as a master device of the PCI system while the responder 440 acts as a target device. The master state machine 412*a* within the PCI bus state machine 412 will record the states of the data transfer operations in the address phase and the data phase. The target state machine 412*b* will also record other related states (according to PCI specification) as well.

The arbiter 408 within the CAA 400 is capable of arbitrating the requests submitted by different functional units 402. The arbiter 408 acts fairly so that each functional unit 402 is able to submit request and share the use of the CAA 400 in data transaction equally. Under the same token, the arbiter 408 also arbitrates between requests submitted by the same functional unit. In addition, decision committed by the arbiter 408 should meet the demands of PCI specification (for example, version 2.1).

When the arbiter (not drawn in FIG. 12) inside the responder 440 picks up the request from the initiator 400, the arbiter will issue a grant signal to the initiator 410 as long as the PCI bus 420 is available. However, the responder 440 is unable to respond to the request of the initiator 400 immediately because the requested data have to be retrieved from somewhere. Hence, the responder 440 will generate a defer identifier DID that corresponds to the initiator 410. The defer identifier DID includes a defer address DfrA and a buffer identifier buffer$_{_id}$. The defer address DfrA corresponds to the initiator 410. The buffer identifier buffer_id represents one of the data processing operations carried on inside the responder 440 that corresponds, for example, to a data processing operation requested by one of the functional units inside one of the initiators. The initiator 410 compares the defer identifier DID with the defer address DfrA stored in the registers, and the operation state about whether or not the responder 440 is processing the delayed transaction can be confirmed. The master state machine 412*a* within the state device 412 will record all relevant states (according to PCI specification) in the data transaction during the address phase and the data phase.

As soon as the responder 440 has retrieved the requested data, the responder 440 will activate the data transaction process. At this stage, the responder 440 acts like the master device in a PCI system while the initiator 410 becomes a target device. The controlling unit 470 of the initiator 410 will re-direct the data from the responder 440 to the data queue 418 via the data distributor 416 according to the buffer identifier buffer_id. The data queue 418 can have a first-in/first-out data structure. Ultimately, the data will be sent to the requesting functional unit 420 according to the agreed PCI specification.

Figure 13:
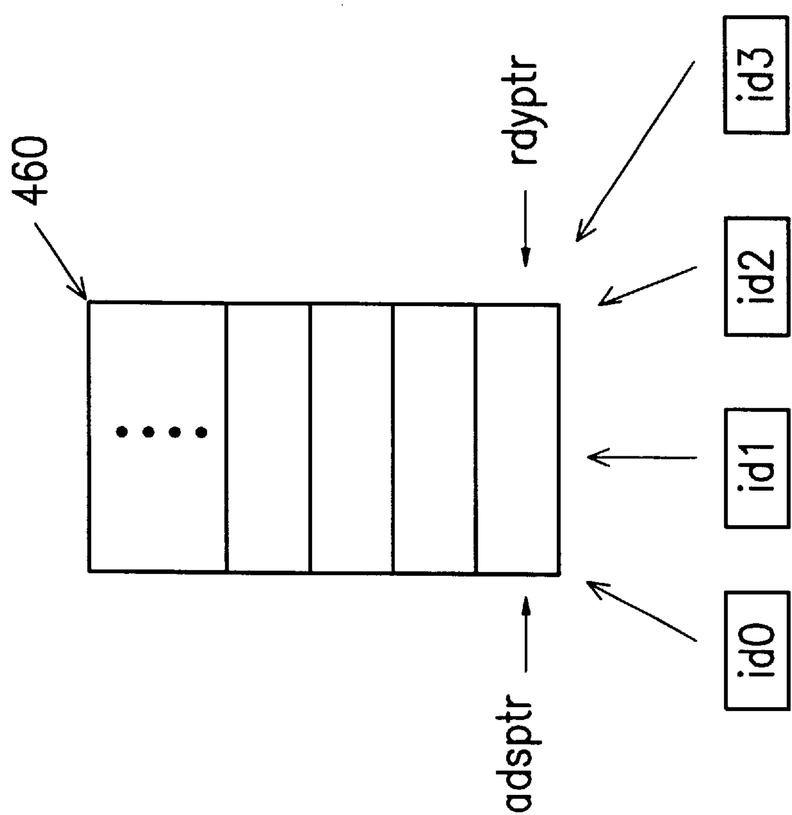
FIG. 13 shows the status of the data buffer within a responder when the multiple of functional units within a device are requesting for data.

FIG. 13 shows the control of the status buffer within a responder when the multiple of functional units within the devices are requesting for data. If a few of the functional units within a device happens to request data simultaneously while working under a defer access mode, the responder 440 will generate a buffer identifier buffer_id for each request from a functional unit. For example, four buffer identifiers id0, id1, id2 and id3 are generated if four different functional units issue requests (all functional units can reside within the same initiator or distributed on different initiators). The status buffer 460 has two pointers: a start pointer adsptr and a ready pointer rdyptr. The start pointer adsptr points to the location where the status of the next identifier should be written into the status buffer 460. The start pointer is increased whenever a new buffer identifier status is stored in the status buffer 460. After the transfer of data from the system memory 450 (in FIG. 11) to the responder 440, the ready pointer rdyptr will point to the location having the status corresponding to currently returned data. The ready pointer rdyptr is increased whenever the data corresponding to the pointed buffer identifier have been transferred. Using both the start pointer adsptr and the ready pointer rdyptr, data can be correctly returned to appropriate functional units. It is obvious from the previous discussion that even though the system memory is able to process just one set of data at a time, the PCI system of this invention can process a number of delaying transaction concurrently.

The initiator 410 only has to submit a request for a particular set of data to the responder 440. As the requested data are ready, the responder 440 will automatically return the requested data to the appropriate requesting functional unit by referring to the defer address DfrA and the buffer identifier buffer_id. Consequently, the initiator 410 can free up the PCI bus 420 most of the time, and system efficiency can be greatly improved. Moreover, a few initiators can issue requests for the PCI bus at the same time. The responder is able to provide each specific functional unit within the initiator a unique buffer identifier buffer_id. Ultimately, the requested data can be returned to each functional unit one after the other as soon as those data are ready inside the responder.

The above example illustrates one of the possible hardware structures for carrying out the delayed transaction using a PCI system of this invention. In practice, however, the actual circuitry should be designed according to the type of system using the invention. Hence, the aforementioned embodiment should not be construed as a restriction of its applications.

In summary, conventional initiator (or master device) will send out data request signal REQ to the target device (or responder) continuously requesting for the use of PCI bus when data are not yet ready in a delayed transaction. Therefore, the PCI bus will be fully occupied by the initiator even when no actual data are transmitted. Consequently, operating efficiency of the PCI bus is lowered. The initiator of this invention does not have to poll the target device repeatedly in a delayed transaction. In fact, the initiator has to send out a data request to the target device for obtaining a particular set of data only once. This is because the target device in this invention is capable of acting like a master device. When the requested data are ready inside the target device, the defer address and the defer identifier will guide the data back to the appropriate functional unit of the appropriate requesting initiator. Hence, the method of operation opt for in this invention can avoid the vain retry cycles, thereby increasing the working efficiency of a PCI bus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of carrying out delayed transaction with respect to a bus system so that data can be transferred between an initiator and a responder both of which are coupled to a bus, the method comprising:

issuing a data request signal from the initiator to the responder requesting permission to use the bus for a data transaction;

generating a defer identifier from the responder comprising, a defer address, and a buffer identifier such that the defer address corresponds to the initiator and a functional unit connected to the initiator, while the buffer identifier corresponds to a transaction process within the responder, which corresponds to the data requesting initiator when the responder is able to accept the data request but is too busy to respond to the request of the initiator immediately;

issuing a response signal and the defer identifier from the responder;

issuing the defer identifier from the responder again when the responder is ready to serve the initiator;

preparing for data transfer by the initiator as soon as the defer identifier is received; and initiating the data transfer between the responder and the initiator when the initiator is ready.

2. A method of carrying out delayed transaction with respect to a bus system so that data can be transferred between an initiator and a responder both of which are coupled to a bus, the method comprising:

issuing a data request signal from the initiator to the responder requesting permission to use the bus for a data transaction;

generating a defer identifier from the responder, which corresponds to the data requesting initiator when the responder is able to accept the data request but is too busy to respond to the request of the initiator immediately;

issuing a response signal and the defer identifier from the responder;

issuing the defer identifier from the responder again when the responder is ready to serve the initiator;

preparing for data transfer by the initiator as soon as the defer identifier is received;

initiating the data transfer between the responder and the initiator when the initiator is ready; and informing the responder to terminate the data transmission between the responder and the initiator immediately when sufficient data has been received.

3. The method of claim 2, wherein the initiator can issue the response signal so that the current data transmission between the initiator and the responder can be terminated immediately, during the process of reading data from the responder, if the responder starts sending more data than that requested by the initiator.

4. The method of claim 3, wherein as the initiator issues a multiple line read instruction for reading data returned by the responder, a continuous data transmission process will take place; such that the target device shall continue to fetch data until a stop signal STOP is sent by the initiator after two lines of data have been received.

5. The method of claim 2, wherein the responder issues a data access request to a main operating system demanding data from a central resource unit as soon as the responder sends out the response signal and the defer identifier.

6. The method of claim 2, wherein the bus comprises a peripheral component interconnect (PCI) bus.

7. The method of claim 2, wherein the response signal issued by the responder comprises a stop signal used in the bus system.

8. The method of claim 2, wherein the initiator stores the defer identifier when the responder issues the response signal and the defer identifier.

9. The method of claim 2, wherein the defer identifier includes a defer address, which corresponds to the initiator.

10. The method of claim 2, wherein the defer identifier includes a defer address and a buffer identifier such that the defer address corresponds to the initiator while the buffer identifier corresponds to a transaction process within the responder.

11. A method of carrying out delayed transaction with respect to a bus system so that data can be transferred between an initiator and a responder both of which are coupled to a bus, the method comprising:

issuing a data request signal from the initiator to the responder requesting permission to use the bus for a data transaction;

generating a defer identifier from the responder, which corresponds to the data requesting initiator when the responder is able to accept the data request but is too busy to respond to the request of the initiator immediately;

issuing a response signal and the defer identifier from the responder, issuing an invalid defer identifier from the responder to the initiator informing the initiator to send out the same data request again if the data request for the bus has been rejected by the responder;

issuing the defer identifier from the responder again when the responder is ready to serve the initiator;

preparing for data transfer by the initiator as soon as the defer identifier is received; and initiating the data transfer between the responder and the initiator when the initiator is ready.

12. A method of carrying out delayed transaction with respect to a bus system so that data can be transferred between a first initiator, a second initiator and a responder all of which are coupled to a bus, comprising the steps of:

the first initiator issuing a data request signal to the responder requesting permission to use the bus for a data transaction;

the responder generating a first defer identifier that corresponds to the data requesting first initiator when the responder is able to accept the data request but is too busy to respond to the request of the first initiator inmmediately;

the responder issuing a response signal and the first defer identifier;

the second initiator issuing a data request signal to the responder requesting permission to use the bus for a data transaction;

the responder generating a second defer identifier that corresponds to the data requesting second initiator when the responder is able to accept the data request but is too busy to respond to the request of the second initiator immediately, the responder issuing the response signal and the second defer identifier;

the responder issuing the first defer identifier again when the responder is ready to serve the first initiator;

the first initiator preparing for data transfer as soon as the first defer identifier is received;

initiating the data transfer between the responder and the first initiator when the first initiator is ready;

the responder issuing the second defer identifier again when the responder is ready to serve the second initiator;

the second initiator preparing for data transfer as soon as the second defer identifier is received; and initiating the data transfer between the responder and the second initiator when the second initiator is ready.

13. The method of claim 12, wherein the bus comprises a peripheral component interconnect (PC1) bus.

14. The method of claim 13, wherein the response signal from the responder comprises a stop signal used in a PCI specification.

15. The method of claim 12, wherein the defer identifier further includes a defer address, which corresponds to the initiator.

16. The method of claim 12, wherein the first defer identifier includes a defer address and a buffer identifier such that the defer address corresponds to the first initiator while the buffer identifier corresponds to a transaction process within the responder.

17. A method of carrying out delayed transaction with respect to a bus system so that data can be transferred between a first initiator, a second initiator and a responder, all of which are coupled to a bus, comprising the steps of:

the first initiator issuing a data request signal to the responder requesting permission to use the bus for a data transaction;

the responder generating a first defer identifier that corresponds to the data requesting first initiator when the responder is able to accept the data request but is too busy to respond to the request of the first initiator immediately;

the responder issuing a response signal and the first defer identifier;

the second initiator issuing a data request signal to the responder requesting permission to use the bus for a data transaction;

the responder generating a second defer identifier that corresponds to the data requesting second initiator when the responder is able to accept the data request but is too busy to respond to the request of the second initiator immediately;

the responder issuing the response signal and the second defer identifier;

the responder issuing the first defer identifier again when the responder is ready to serve the first initiator;

the first initiator preparing for data transfer as soon as the first defer identifier is received;

initiating the data transfer between the responder and the first initiator when the first initiator is ready;

the first initiator issues the response signal informing the responder to terminate the data transmission between the responder and the first initiator immediately when sufficient data has been received, wherein the second initiator may or may not issue a response signal;

the responder issuing the second defer identifier again when the responder is ready to serve the second initiator;

the second initiator preparing for data transfer as soon as the second defer identifier is received;

initiating the data transfer between the responder and the second initiator when the second initiator is ready, and the second initiator issues the response signal informing the responder to terminate the data transmission between the responder and the second initiator immediately when sufficient data has been received.

18. The method of claim 17, wherein the bus comprises a peripheral component interconnect (PCI) bus.

19. The method of claim 18, wherein the response signal from the responder comprises a stop signal used in a PCI specification.

20. The method of claim 17, wherein the defer identifier further includes a defer address, which corresponds to the initiator.

21. The method of claim 17, wherein the first defer identifier includes a defer address and a buffer identifier such that the defer address corresponds to the first initiator while the buffer identifier corresponds to a transaction process within the responder.

22. A method of carrying out delayed transaction with respect to a bus system so that data can be transferred between a first initiator, a second initiator and a responder, all of which are coupled to a bus, comprising the steps of:

the first initiator issuing a data request signal to the responder requesting permission to use the bus for a data transaction;

the responder generating a first defer identifier that corresponds to the data requesting first initiator when the responder is able to accept the data request but is too busy to respond to the request of the first initiator immediately;

the responder issuing a response signal and the first defer identifier;

the second initiator issuing a data request signal to the responder requesting permission to use the bus for a data transaction;

the responder to return an invalid defer identifier to the second initiator informing the second initiator to send out the same data request again if the request for bus from the second initiator has been rejected by the responder;

the responder generating a second defer identifier that corresponds to the data requesting second initiator when the responder is able to accept the data request but is too busy to respond to the request of the second initiator immediately, the responder issuing the response signal and the second defer identifier;

the responder issuing the first defer identifier again when the responder is ready to serve the first initiator, the first initiator preparing for data transfer as soon as the first defer identifier is received;

initiating the data transfer between the responder and the first initiator when the first initiator is ready;

the responder issuing the second defer identifier again when the responder is ready to serve the second initiator;

the second initiator preparing for data transfer as soon as the second defer identifier is received; and initiating the data transfer between the responder and the second initiator when the second initiator is ready.

23. The method of claim 22, wherein the bus comprises a peripheral component interconnect (PCI) bus.

24. The method of claim 23, wherein the response signal from the responder comprises a stop signal used in a PCI specification.

25. The method of claim 22, wherein the defer identifier further includes a defer address, which corresponds to the initiator.

26. The method of claim 22, wherein the first defer identifier includes a defer address and a buffer identifier such that the defer address corresponds to the first initiator while the buffer identifier corresponds to a transaction process within the responder.

27. A method of carrying out delayed transaction with respect to a bus system so that data can be transferred between an initiator and a responder both of which are coupled to a bus, comprising the steps of:

the initiator issuing a first data request signal to the responder requesting permission to use the bus for a data transaction;

the responder generating a first defer identifier that corresponds to the first data request of the initiator when the responder is able to accept the first data request but is too busy to respond to the first request from the initiator immediately;

the responder issuing a first response signal and the first defer identifier, wherein the first response signal corresponds to the first defer identifier;

the initiator issuing a second data request signal to the responder requesting permission to use the bus for a data transaction again;

the responder generating a second defer identifier that corresponds to the second data request of the initiator when the responder is able to accept the second data request but is too busy to respond to the second request from the initiator immediately;

the responder issuing a second response signal and the second defer identifier, wherein the second response signal corresponds to the second defer identifier;

the responder issuing the first defer identifier again when the responder is ready to serve the first request provided by the initiator;

the initiator preparing for data transfer as soon as the first defer identifier is received;

initiating the first data transfer between the responder and the initiator when the initiator is ready;

the responder issuing the second defer identifier again when the responder is ready to serve the second request of the initiator;

the initiator preparing for data transfer as soon as the second defer identifier is received; and initiating the second data transfer between the responder and the initiator when the initiator is ready.

28. The method of claim 27, wherein the bus comprises a peripheral component interconnect (PCI) bus.

29. The method of claim 28, wherein each of the first and the second response signals from the responder comprises a stop signal used in a PCI specification.

30. The method of claim 27, wherein the first defer identifier includes a defer address and a first buffer identifier, the second defer identifier includes a defer address and a second buffer identifier, such that the defer address corresponds to the initiator, and the first and the second buffer identifier corresponds to a first and a second transaction process within the responder respectively.

31. The method of claim 27, wherein the transaction further includes an initiator that can issue the response signals informing the responder to terminate the data transmission between the initiator and the responder inmmediately when sufficient data for the first data request has been received.

32. A method of carrying out delayed transaction with respect to a bus system so that data can be transferred between an initiator and a responder both of which are coupled to a bus, comprising the steps of:

the initiator issuing a first data request signal to the responder requesting permission to use the bus for a data transaction;

the responder generating a first defer identifier that corresponds to the first data request of the initiator when the responder is able to accept the first data request but is too busy to respond to the first request from the initiator immediately;

the responder issuing a first response signal and the first defer identifier, wherein the first response signal corresponds to the first defer identifier;

the initiator issuing a second data request signal to the responder requesting permission to use the bus for a data transaction again;

the responder to return an invalid defer identifier to the initiator informing the initiator to send out the same data request again if the second data request for the bus has been rejected by the responder;

the responder generating a second defer identifier that corresponds to the second data request of the initiator when the responder is able to accept the second data request but is too busy to respond to the second request from the initiator immediately;

the responder issuing a second response signal and the second defer identifier, wherein the second response signal corresponds to the second defer identifier;

the responder issuing the first defer identifier again when the responder is ready to serve the first request provided by the initiator;

the initiator preparing for data transfer as soon as the first defer identifier is received;

initiating the first data transfer between the responder and the initiator when the initiator is ready;

the responder issuing the second defer identifier again when the responder is ready to serve the second request of the initiator;

the initiator preparing for data transfer as soon as the second defer identifier is received; and initiating the second data transfer between the responder and the initiator when the initiator is ready.

33. The method of claim 32, wherein the bus comprises a peripheral component interconnect (PCI) bus.

34. The method of claim 33, wherein each of the first and the second response signals from the responder comprises a stop signal used in a PCI specification.

35. The method of claim 32, wherein the first defer identifier includes a defer address and a first buffer identifier, the second defer identifier includes a defer address and a second buffer identifier, such that the defer address corresponds to the initiator, and the first and the second buffer identifier corresponds to a first and a second transaction process within the responder respectively.

36. The method of claim 24, wherein the transaction further includes an initiator that can issue the response signals informing the responder to terminate the data transmission between the initiator and the responder immediately when sufficient data for the first data request has been received.

37. A bus system, comprising:

a bus;

a responder coupled to the bus; and an initiator also coupled to the bus capable of requesting the bus for accessing data in the responder, such that if the responder is able to accept the request but cannot respond to the request soon enough, the responder generates a defer identifier that corresponds to the requesting initiator and then submit to the initiator for storage, and as soon as the responder retrieves the data and is ready to respond, the same defer identifier is issued so that the initiator can compare with its own copy of the identifier, if the identifiers match, the transfer of data between the responder and the initiator starts.

38. The bus system of claim 37, wherein the bus comprises a peripheral component interconnect (PCI) bus.

39. The bus system of claim 37, wherein the responder further includes a defer identifier generator for generating a defer identifier.

40. The bus system of claim 37, wherein the responder further includes a data queue for temporarily storing the data requested by the initiators.

41. The bus system of claim 40, wherein the data queue is further coupled to a central resource unit.

42. The bus system of claim 37, wherein the initiator further includes a defer address register for comparing with the responder generated defer identifier.

43. The bus system of claim 37, wherein the defer identifier further includes a defer address, which corresponds to the initiator.

44. The bus system of claim 37, wherein the defer identifier further includes a defer address and a buffer identifier such that the defer address corresponds to the initiator while the buffer identifier corresponds to a transaction process within the responder.

45. A bus compatible initiator that couples to a responder via a bus, comprising:

a controller;

an address queue coupled to the controller for storing an address information used by the initiator for accessing data in the responder;

a PCI bus state machine coupled to the controller, the PCI bus state machine includes a master state machine for recording a state of the initiator when the initiator requests data from the responder, and a target state machine for recording a state of the initiator when the initiator is receiving data from the responder;

a defer identifier register coupled to the controller for storing a defer identifier of the responder;

a data distributor coupled to the controller for distributing the returned data from the responder to the corresponding initiator; and a data queue coupled to the distributor for storing the returned data.

46. The bus compatible initiator of claim 45, wherein the bus comprises a peripheral component interconnect (PCI) bus.

47. The bus compatible initiator of claim 45, wherein the initiator includes at least one functional unit that is coupled to the address queue and the data queue used by the initiator to store the address information and the returned data from the responder.

48. The bus compatible initiator of claim 47, wherein the functional unit is coupled to the initiator through a standard peripheral component interconnect (PCI) interface.

49. The bus compatible initiator of claim 45, wherein the defer identifier includes a defer address, which corresponds to the initiator.

50. The bus compatible initiator of claim 45, wherein the defer identifier includes a defer address and a buffer identifier such that the defer address corresponds to the initiator while the buffer identifier corresponds to a transaction process in the responder.

51. The bus compatible initiator of claim 45, wherein the data queue operates according to a first-in first-out data structure.

52. A bus compatible initiator that couples to a responder via a bus, comprising:

a controller;

an address queue coupled to the controller for storing an address information used by the initiator for accessing data in the responder;

a PCI bus state machine coupled to the controller, the PCI bus state machine includes a master state machine for recording a state of the initiator when the initiator requests data from the responder, and a target state machine for recording a state of the initiator when the initiator is receiving data from the responder;

a defer identifier register coupled to the controller for storing a defer identifier of the responder;

a data distributor coupled to the controller for distributing the returned data from the responder to the corresponding initiator;

a data queue coupled to the distributor for storing the returned data;

at least one functional unit that is coupled to the address queue and the data queue used by the initiator to store the address information and the returned data from the responder;

the functional unit is coupled to the initiator through a standard peripheral component interconnect (PCI) interface; and the target state machine couples to the address queue, the data queue and the functional units for recording initiator's state when the functional units request for data, and an arbiter that is coupled to the address queue and the controller for arbitrating the data requests among the functional units.

53. The bus compatible initiator of claim 52, wherein the bus comprises a peripheral component interconnect (PCI) bus.

54. The bus compatible initiator of claim 52, wherein the defer identifier includes a defer address, which corresponds to the initiator.

55. The bus compatible initiator of claim 52, wherein the defer identifier includes a defer address and a buffer identifier such that the defer address corresponds to the initiator while the buffer identifier corresponds to a transaction process in the responder.

56. The bus compatible initiator of claim 52, wherein the data queue operates according to a first-in first-out data structure.

* * * * *